US011948401B2

(12) United States Patent
Bian et al.

(10) Patent No.: US 11,948,401 B2
(45) Date of Patent: Apr. 2, 2024

(54) AI-BASED PHYSICAL FUNCTION ASSESSMENT SYSTEM

(71) Applicant: Nightingale.ai Corp., Surrey (CA)

(72) Inventors: Chao Bian, Vaughan (CA); Peter Tanugraha, Toronto (CA); Charlene Chu, Toronto (CA)

(73) Assignee: Nightingale.ai Corp., Surrey (CA)

( * ) Notice: Subject to any disclaimer, the term of this patent is extended or adjusted under 35 U.S.C. 154(b) by 409 days.

(21) Appl. No.: 16/995,523

(22) Filed: Aug. 17, 2020

(65) Prior Publication Data

US 2021/0049353 A1 Feb. 18, 2021

Related U.S. Application Data

(60) Provisional application No. 62/888,469, filed on Aug. 17, 2019.

(51) Int. Cl.
*G06K 9/00* (2022.01)
*G06F 18/2135* (2023.01)
(Continued)

(52) U.S. Cl.
CPC .......... *G06V 40/25* (2022.01); *G06F 18/2135* (2023.01); *G06N 3/04* (2013.01);
(Continued)

(58) Field of Classification Search
CPC ......... H04N 21/4884; H04N 21/47202; H04N 21/47217; H04N 21/4856; G09B 21/00; G09B 19/06
See application file for complete search history.

(56) References Cited

U.S. PATENT DOCUMENTS 7,988,647 B2 8/2011 Bunn et al.
10,083,352 B1 9/2018 Solh et al.
(Continued)

FOREIGN PATENT DOCUMENTS

CN 107895161 A 4/2018
CN 108345869 A 7/2018
(Continued)

OTHER PUBLICATIONS

Jang, "SKT, artificial intelligence robot market entry table", Robot Newspaper, Feb. 22, 2017 (9 pages with machine English translation) <http://www.irobotnews.com/news/articleView.html?idxno=9945>.
(Continued)

*Primary Examiner* — Dhaval V Patel
(74) *Attorney, Agent, or Firm* — BERESKIN & PARR LLP/S.E.N.C.R.L. s.r.l; Tonino Rosario Orsi

(57) ABSTRACT

Various embodiments of devices, systems, and methods for providing AI-based physical function assessment recordings and assessment performance analytics for a subject are described. A series of video frames are obtained that include the subject. Computer vision techniques that use artificial neural networks may be applied to the video frames to: detect a Person of Interest (POI) and an Object of Interest (OOI) in the video frames; track movement of the POI and the location of the OOI in subsequent video frames; detect body key points; and detect postures and posture transitions of the POI. Physical function indicators may be calculated and function analytics provided based on the assessment.

24 Claims, 21 Drawing Sheets

(51) Int. Cl.
*G06N 3/04* (2023.01)
*G06T 11/20* (2006.01)
*G06V 10/25* (2022.01)
*G06V 10/764* (2022.01)
*G06V 10/82* (2022.01)
*G06V 20/40* (2022.01)
*G06V 40/20* (2022.01)

(52) U.S. Cl.
CPC ............. *G06T 11/20* (2013.01); *G06V 10/25* (2022.01); *G06V 10/764* (2022.01); *G06V 10/82* (2022.01); *G06V 20/41* (2022.01); *G06V 40/23* (2022.01); *G06T 2210/12* (2013.01)

(56) References Cited

U.S. PATENT DOCUMENTS

| | | | |
|---|---|---|---|
| 10,825,188 B1 * | 11/2020 | Tan | ...................... G06V 10/764 |
| 2013/0345524 A1 | 12/2013 | Meyer et al. | |
| 2018/0158197 A1 | 6/2018 | Dasgupta et al. | |
| 2018/0186452 A1 | 7/2018 | Tian et al. | |
| 2019/0087661 A1 | 3/2019 | Lee et al. | |
| 2019/0246921 A1 | 8/2019 | Wu et al. | |
| 2019/0392242 A1 * | 12/2019 | Tariq | ...................... G06K 9/627 |
| 2020/0249752 A1 * | 8/2020 | Parshionikar | ......... G06F 1/1694 |
| 2020/0311948 A1 * | 10/2020 | Rhodes | .................... G06N 3/08 |

FOREIGN PATENT DOCUMENTS

| | | | | |
|---|---|---|---|---|
| CN | 108960178 A | | 12/2018 | |
| CN | 109190544 A | | 1/2019 | |
| CN | 109241881 A | | 1/2019 | |
| CN | 110008847 A | | 7/2019 | |
| WO | WO-2020240212 A1 * | 12/2020 | ............. G06T 11/00 |

OTHER PUBLICATIONS

"Smart Assessment for Older Adults", Nightingale.ai Corp., Applicant's Age-Well 4th Annual Conference presentation slides, Oct. 16-18, 2018, (13 pages).

* cited by examiner

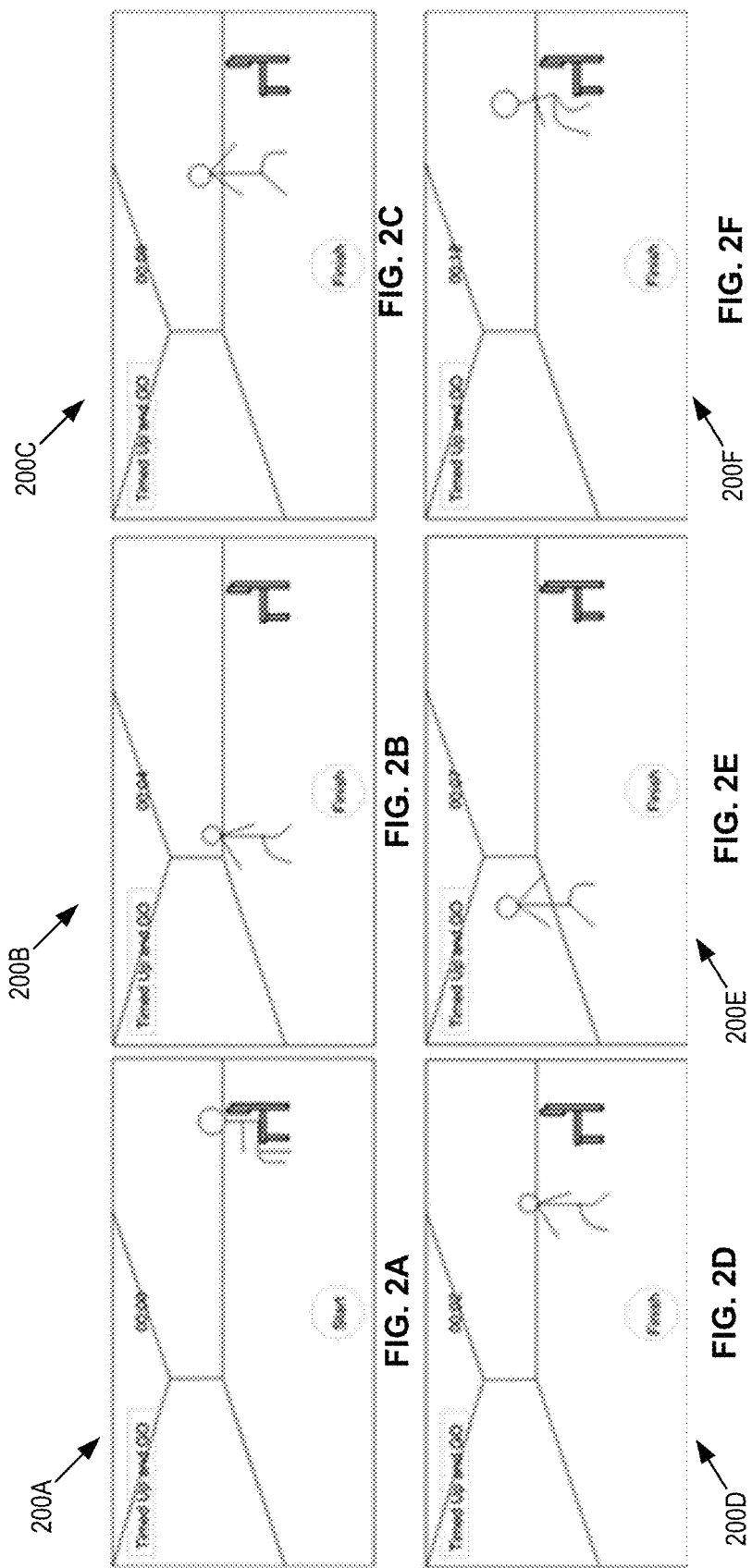

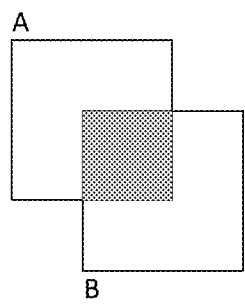
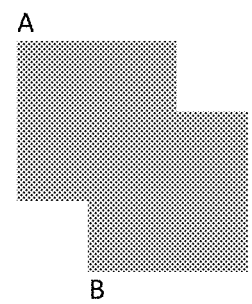
FIG. 20  FIG. 21

AI-BASED PHYSICAL FUNCTION ASSESSMENT SYSTEM

CROSS-REFERENCE

This application claims the benefit of U.S. Provisional Patent Application No. 62/888,469, filed Aug. 17, 2019, and the entire contents of U.S. Provisional Patent Application No. 62/888,469 are hereby incorporated by reference.

FIELD

Various embodiments are described herein that generally relate to an AI-based physical function assessment system, as well as the methods and systems for generating analytics of physical function assessment with a mobile device having a camera for capturing various assessment test data.

BACKGROUND

The following paragraphs are provided by way of background to the present disclosure. They are not, however, an admission that anything discussed therein is prior art or part of the knowledge of persons skilled in the art.

Traditional methods of physical function assessment for human beings require the completion of one or more standardized and validated tests. These tests include the Timed Up and Go, Sit to Stand, and 2-10 minute walk tests, which require the participant to engage in a series of functional movements. These tests can measure several aspects of physical function, such as the number of repetitions and the time it takes to complete the test. Generally, the observer has training in how to get the participant to complete the test and how to measure the test results. Since these are observation-based measures, a degree of knowledge, critical thinking, and skill is required to conduct and interpret these tests. Results of these tests are interpreted by normative values informed by research and current literature or by thresholds that accompany each test.

However, the traditional way of assessing physical functions has some limitations. The assessments are complex and require trained clinicians to administer them. Despite training, observation-based measures are still prone to inter-rater variability. In busy or rural clinical settings where the clinician-to-patient ratio is low, trained clinicians are not always available, which results in delayed or no assessments for people in need. Inconsistent assessment results between clinicians and unnecessary repeated assessments increase the workload burden on staff and healthcare costs. This further affects caregivers since identifying functional change in a timely manner for better care planning and initiation of interventions to prevent further decline may be delayed or incorrect. Furthermore, in our globally ever-increasing aging population and era of person-centered medicine, current physical function assessments conducted by clinicians are not a sustainable option to meet ever increasing healthcare needs. In addition, lack of physical function assessment and tracking functional decline can lead to increased risk of falling and irreversible functional loss.

SUMMARY OF VARIOUS EMBODIMENTS

Various embodiments of an AI-based physical assessment system and methods of use thereof, and computer products for use therewith, are provided according to the teachings herein.

In one aspect, in accordance with the teachings herein, there is provided an AI-based method for performing at least one of Person of Interest (POI) and Object of Interest (OOI) tracking, wherein the method is performed by at least one processor. The method comprises: receiving a video frame; receiving a bounding box location for a bounding box associated with a target object in the video frame, the target object being one of a POI and an OOI; receiving bounding box coordinates associated with the bounding box location; outputting the bounding box location on a display in real time; determining a predicted location of the target object; computing intersection over union (IOU) values between the bounding box location and other bounding box locations within the video frame; selecting the bounding box location having a highest IOU value; and outputting the selected bounding box location in the video frame on the display.

In at least one embodiment, the method comprises: converting the video frame into a tensor with multiple dimensions; feeding the tensor into a feedforward neural network; extracting features from the video frame based on outputs from the feedforward neural network; generating a feature map by applying a convolutional neural network to the extracted features; determining the target objects with associated confidence scores from the feature map; and outputting the bounding box location based on a location of the target object having a highest associated confidence score.

In at least one embodiment, the method comprises applying the convolutional neural network by performing convolutional and activation operations wherein for a given layer of the convolutional neural network a given convolutional operation is applied to an output of a previous layer in the convolutional neural network to generate a matrix and the matrix is processed using a given activation operation to generate the feature map.

In at least one embodiment, the method comprises applying different filters for the activation operations that are performed at different layers of the convolutional neural network.

In at least one embodiment, the method comprises performing feature extraction and posture recognition of a Person of Interest (POI). The method further comprises: calculating key points of the POI in a series of video frames; performing geometric operations on the calculated key points to extract feature data; performing linear interpolation operations on the extracted feature data to determine missing feature data; dividing the video frames into a batch of m video frames that correspond to m groups of feature data; feeding the m groups of feature data into an artificial neural network; obtaining confidence scores of posture and optionally gait for the POI in the m video frames based on the output of the artificial neural network; determining a weighted average of confidence scores for each of the video frames; and confirming a posture classification and optionally a gait classification for each of the video frames by comparing the weighted average of confidence scores for each of the video frames.

In at least one embodiment, the method comprises calculating indicators related to a physical function performed by the POI using the confirmed posture classification and the optional gait classification.

In at least one embodiment, the method comprises: calculating the m groups of feature data based on key points of the POI; calculating a first set of features by using a first convolutional layer of a convolutional neural network; calculating a second set of features by using a second convolutional layer in the convolutional neural network; processing the first set of features and the second set of features by applying at least one of maximum pooling and flattening; generating a fully connected layer for performing classification using the first set of features and the second set of features; determining potential classification results using the fully connected layer, where a potential classification result includes a posture class having a confidence score; and outputting a classification result as the posture class having a highest confidence score.

In at least one embodiment, the method comprises extracting body key points for calculating physical function features for the person of interest (POI), the POI being contained within the video frame. The method further comprises: cropping the video frame to generate a cropped image; feeding the cropped image into an artificial neural network to produce a heatmap tensor and an offset tensor; determining output dimensions based at least in part on a size of the cropped image; processing the heatmap tensor and the offset tensor based at least in part on the output dimensions to estimate poses of the POI and generate respective confidence values; and producing a final output of body key point coordinates based on the estimated poses and the respective confidence values.

In at least one embodiment, the cropped image has square dimensions.

In at least one embodiment, the method determines the estimated poses by performing feature extraction and posture recognition of the Person of Interest (POI).

In at least one embodiment, any of the methods described herein may be applied to physical function assessment in at least one of sport injury rehabilitation, child development rehabilitation, elderly physical function tests, limb-related exercise performance, weight training, or yoga exercise.

In at least one embodiment, the physical function assessment comprises at least one of a timed up and go test, a sit to stand test, a balance test, a bed mobility test, a transfer between surfaces test, a walk test, a range of motion test, or a gait test.

In another aspect, in accordance with the teachings herein, there is provided a method of generating physical function assessment recordings and assessment performance analytics for a subject, wherein the method is performed by at least one processor. The method comprises: obtaining a series of video frames including the subject; detecting the subject as a Person of Interest (POI) and detecting an Object of Interest (OOI) in one of the video frames; tracking movement of the POI and the location of the OOI in subsequent video frames; detecting at least one of postures and posture transitions of the POI based on the tracking; calculating test completion time for the POI based on the tracking and a type of physical function being performed by the POI in the video frames; calculating at least one physical function indicator from the tracking; and generating function analytics based at least in part on the test completion time and the at least one physical function indicator.

In at least one embodiment, the method further comprises measuring gait parameters of the POI based on the tracking.

In at least one embodiment, the tracking of the POI and/or OOI comprises: receiving a bounding box location for a bounding box associated with a target object in the one of the video frames, the target object being one of the POI or the OOI; receiving bounding box coordinates associated with the bounding box location; determining a predicted location of the target object; computing intersection over union (IOU) values between the bounding box location and other bounding box locations within the one of the video frames; selecting the bounding box location having a highest IOU value; and outputting the selected bounding box location as representing the movement or location of the target object.

In at least one embodiment, the detecting of the POI and/or the OOI comprises: converting the one of the video frames into a tensor with multiple dimensions, the tensor being associated with a target object in the one of the video frames, the target object being one of the POI or the OOI; feeding the tensor into a feedforward neural network; extracting features from the one of the video frames based on outputs from the feedforward neural network; generating a feature map by applying a convolutional neural network to the extracted features; determining the target object with associated confidence scores from the feature map; and outputting the bounding box location based on a location of the target object having a highest associated confidence score.

In at least one embodiment, the detecting of postures and/or posture transitions of the POI comprises: calculating key points of the POI in the series of video frames; performing geometric operations on the calculated key points to extract feature data; performing linear interpolation operations on the extracted feature data to determine missing feature data; dividing the video frames into a batch of m video frames that correspond to m groups of feature data; feeding the m groups of feature data into an artificial neural network; obtaining confidence scores of posture and optionally gait for the POI in the m video frames based on the output of the artificial neural network; determining a weighted average of confidence scores for each of the video frames; and confirming a posture classification and optionally a gait classification for each of the video frames by comparing the weighted average of confidence scores for each of the video frames.

In at least one embodiment, the calculating of at least one physical function indicator comprises: cropping the one of the video frames to generate a cropped image; feeding the cropped image into an artificial neural network to produce a heatmap tensor and an offset tensor; determining output dimensions based at least in part on a size of the cropped image; processing the heatmap tensor and the offset tensor based at least in part on the output dimensions to estimate poses of the POI and generate respective confidence values; and producing a final output of body key point coordinates based on the estimated poses and the respective confidence values.

In at least one embodiment, the method is applied to physical function assessment in at least one of sport injury rehabilitation, child development rehabilitation, elderly physical function tests, limb-related exercise performance, weight training, and yoga exercise.

In at least one embodiment, the physical function assessment comprises at least one of a timed up and go test, a sit to stand test, a balance test, a bed mobility test, a transfer between surfaces test, a walk test, a range of motion test, or a gait test.

In another aspect, in accordance with the teachings herein, there is provided a device for performing an AI-based physical assessment, wherein the device comprises: a data store having stored thereon computer-executable instructions; and at least one processor that is operatively coupled to the data store and, when executing the computer-executable instructions, is configured to perform at least one of: an AI-based method for performing at least one of Person of Interest (POI) and Object of Interest (OOI) tracking; an AI-based method for performing feature extraction and posture recognition of the POI; an AI-based method for extracting body key points for calculating physical function features for the POI; or a method of generating physical function assessment recordings and assessment performance analytics for a subject.

In at least one embodiment, to perform the AI-based method for performing at least one of Person of Interest (POI) and Object of Interest (OOI) tracking, the at least one processor is configured to: receive a video frame; receive a bounding box location for a bounding box associated with a target object in the video frame, the target object being one of the POI and the OOI; receive bounding box coordinates associated with the bounding box location; output the bounding box location on a display in real time; determine a predicted location of the target object; compute intersection over union (IOU) values between the bounding box location and other bounding box locations within the video frame; select the bounding box location having a highest IOU value; and output the selected bounding box location in the video frame on the display.

In at least one embodiment, to perform the AI-based method for performing feature extraction and posture recognition of the POI, the at least one processor is configured to: calculate key points of the POI in a series of video frames; perform geometric operations on the calculated key points to extract feature data; perform linear interpolation operations on the extracted feature data to determine missing feature data; divide the video frames into a batch of m video frames that correspond to m groups of feature data; feed the m groups of feature data into an artificial neural network; obtain confidence scores of posture and optionally gait for the POI in the m video frames based on the output of the artificial neural network; determine a weighted average of confidence scores for each of the video frames; and confirm a posture classification and optionally a gait classification for each of the video frames by comparing the weighted average of confidence scores for each of the video frames.

In at least one embodiment, to perform the AI-based method for extracting body key points for calculating physical function features for the POI, the at least one processor is configured to: receive a video frame containing the POI; crop the video frame to generate a cropped image; feed the cropped image into an artificial neural network to produce a heatmap tensor and an offset tensor; determine output dimensions based at least in part on a size of the cropped image; process the heatmap tensor and the offset tensor based at least in part on the output dimensions to estimate poses of the POI and generate respective confidence values; and produce a final output of body key point coordinates based on the estimated poses and the respective confidence values.

In at least one embodiment, to perform the method of generating physical function assessment recordings and assessment performance analytics for a subject, the at least one processor is configured to: obtain a series of video frames including the subject; detect the subject as the POI and detecting the OOI in one of the video frames; track movement of the POI and the location of the OOI in subsequent video frames; detect at least one of postures and posture transitions of the POI based on the tracking; calculate test completion time for the POI based on the tracking and a type of physical function being performed by the POI in the video frames; calculate at least one physical function indicator from the tracking; and generate function analytics based at least in part on the test completion time and the at least one physical function indicator.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, byway of example, to the accompanying drawings which show at least one example embodiment, and which are now described. The drawings are not intended to limit the scope of the teachings described herein.

FIGS. 2A-2F show example screen captures representing an ongoing video recording of a physical function assessment.

FIGS. 20 and 21 illustrate different amounts of overlap for example bounding boxes.

Figure 1A:
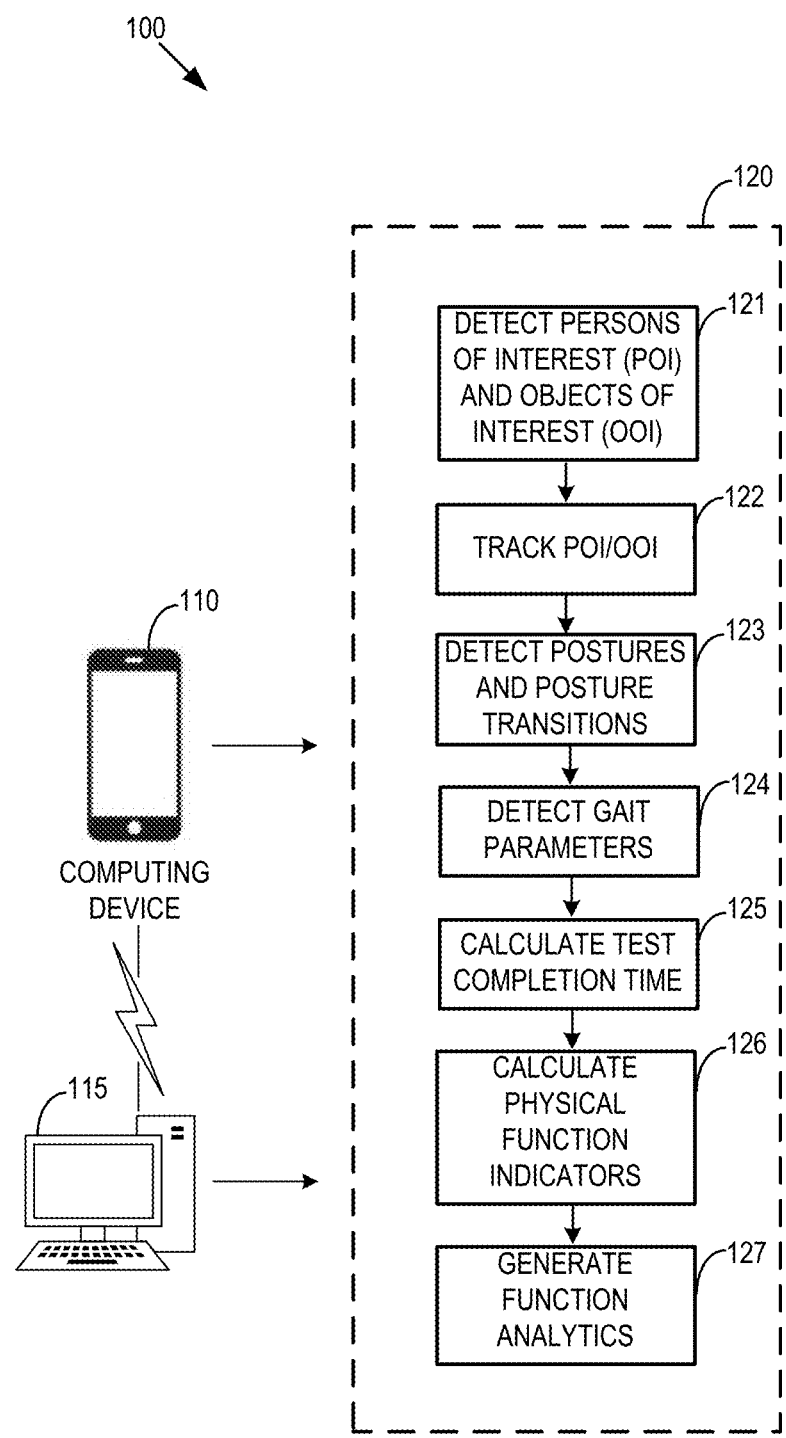
FIG. 1A illustrates an example embodiment of a physical function assessment system for generating physical function assessment recordings and performing various aspects of a physical function assessment including performance analytics.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof when modified by the term "about" are presumed to be modified by a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as one or more of a display, a printer, and the like depending on the implementation of the hardware.

It should also be noted that there may be some elements that are used to implement at least part of the embodiments described herein that may be implemented via software that is written in a high-level procedural language such as object-oriented programming. The program code may be written in Swift, Python, MATLAB, C, C++, or any other suitable programming language and may comprise modules or classes, as is known to those skilled in object oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having a processor, an operating system, and the associated hardware and software that is necessary to implement the functionality of at least one of the embodiments described herein. The software program code, when read by the device, configures the device to operate in a new, specific, and predefined manner (e.g., as a specific purpose computer) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

There is a need to improve physical function assessment in a more accessible, standardized, and less time-consuming manner. Such an improvement in the assessment practice may enable timely detection of functional change and reduce healthcare costs associated with unnecessary repeated assessments and unidentified functional change. As physical function assessments are based on clinicians' observations of mobility performance of a person, an advancement in the state of the art of physical function assessment may result if an objective standardized assistive tool exists to help clinicians capture and analyze mobility performance.

In accordance with the teachings herein, there are provided various embodiments for devices and methods for an AI-based physical function assessment system.

Broadly, at least one embodiment described in accordance with the teachings herein relates to real-time analysis of physical function assessments. Such embodiments may use methods and systems for physical function assessment analysis which can be implemented using personal computing devices such as, but not limited to, smartphones, tablets, and laptops, for example. It should be understood by persons of ordinary skill in the art that the use of terms "physical function", "mobility function" and "physical function assessment" in this disclosure refer to multiple clinically proven physical function assessment scales. In other words, at least one example embodiment described herein may be used for capturing and analyzing physical function or mobility assessments, as long as there is at least one person present in a setting (e.g., a room or a hallway) whose movements are being recorded.

In addition, it should also be clear to one of ordinary skill in the art that at least one of the example embodiments described herein may also be applied to physical function assessment for sport injury rehabilitation, kid's rehabilitation (e.g., child development rehabilitation), elderly physical function tests, or regular exercises that involve body movement or mobility of limbs and trunks (e.g., walking, weightlifting, weight training, yoga), where the "physical function" or "mobility" refers to a person's ability to perform a variety of physical tasks from dressing and bathing, to walking one or more blocks, to vigorous exercise.

For instance, in one aspect, at least one example embodiment is described herein that includes a computer-implemented method of physical function assessment that may comprise: identifying a subject and objects (e.g., a chair, a walking aid, or furniture) that the subject interacts with (the subject is the person who is undergoing the physical function assessment and the subject may be a patient for example); tracking movements of the subject; detecting gait parameters (e.g., number of steps, cadence, stride length, arm swing) based on the movements of the subject; detecting body postures of the subject (e.g., sitting, sit to stand transition, standing, walking, turning, stand to sit transition); measuring test completion time (e.g., stage time, posture transition time, total completion time); analyzing at least one of mobility, balance, fall risk, and transfer safety; evaluating assessment performance; generating assessment results; and recording the assessment process in a video that may be replayed.

In another aspect, at least one example embodiment is described herein that includes a computer-implemented method of physical function assessment that may comprise: providing contextual video playback experience after a physical function assessment; generating other statistics and analytics relevant to the physical function assessment; and showing the other statistics and analytics along with the video playback experience. This may all be done by using a computing device such as, but not limited to, a smartphone, a laptop, a tablet, or a desktop computer, for example.

In another aspect, each step of the physical function analysis processes as disclosed herein may be performed in real time or in an off-line fashion, automatically or upon user request.

It should be noted that in some example embodiments described herein, one or more of the processing steps in the methods may be optional.

In at least one embodiment, a stationary camera is located on a mobile user device. The mobile device and the camera situated therein remain stationary during the video capturing process. For example, a tripod may be used, or the mobile device may be hand-held in which case motion compensation may be applied to the video recording to reduce minor motion effects such as blur and jitter.

Unlike conventional computer vision-based real-time human physical function (e.g., gait and posture) analysis systems that require standalone depth or high-resolution cameras dedicated to this application and mounted on top of or alongside a wall in a space (e.g., room or hallway) and the use of high-end desktop or server hardware, at least one of the example embodiments described herein allows users to perform real-time analysis of human physical function with one's own mobile device such as a smartphone, a tablet, a laptop, or smart glasses without requiring extra standalone hardware.

In another aspect, in at least one example embodiment described herein, computer vision techniques such as at least one of image registration, motion detection, background subtraction, object tracking, 3D reconstruction techniques, cluster analysis techniques, pose estimation, sensor fusion, and modern machine learning techniques such as but not limited to a convolutional neural network (CNN), a Mask R-CNN, three-dimensional (3D) pose estimation, 3D object detection, and bi-directional long short-term memory, for example, may be selectively combined to perform high accuracy analysis in real time on a mobile device. However, the limited computational resources in a mobile device present a technical challenge. For instance, a smartphone's limited CPU processing power is heat-sensitive. The CPU clock rate is reduced by the operating system (OS) whenever the phone heats up. Also, when a system consumes too much memory, it can be disabled by the OS.

The choice of neural network models over other machine learning models for computer vision is due to at least in part to neural network models being more: (1) accurate since a neural network's learning capacity is much bigger than a traditional machine learning classifier and (2) robust to changes. For example, a Support Vector Machine (SVM) classifier simply learns boundaries which separates the classes, whereas a neural network will learn many intricate features from the dataset itself. For example, a 1-dimensional CNN can be used to learn temporal features, where this is not possible for the SVM classifier. Alternatively, or in addition, an n-dimensional CNN can be used, where the number of dimensions is chosen, for example, for greater accuracy.

Figure 14:
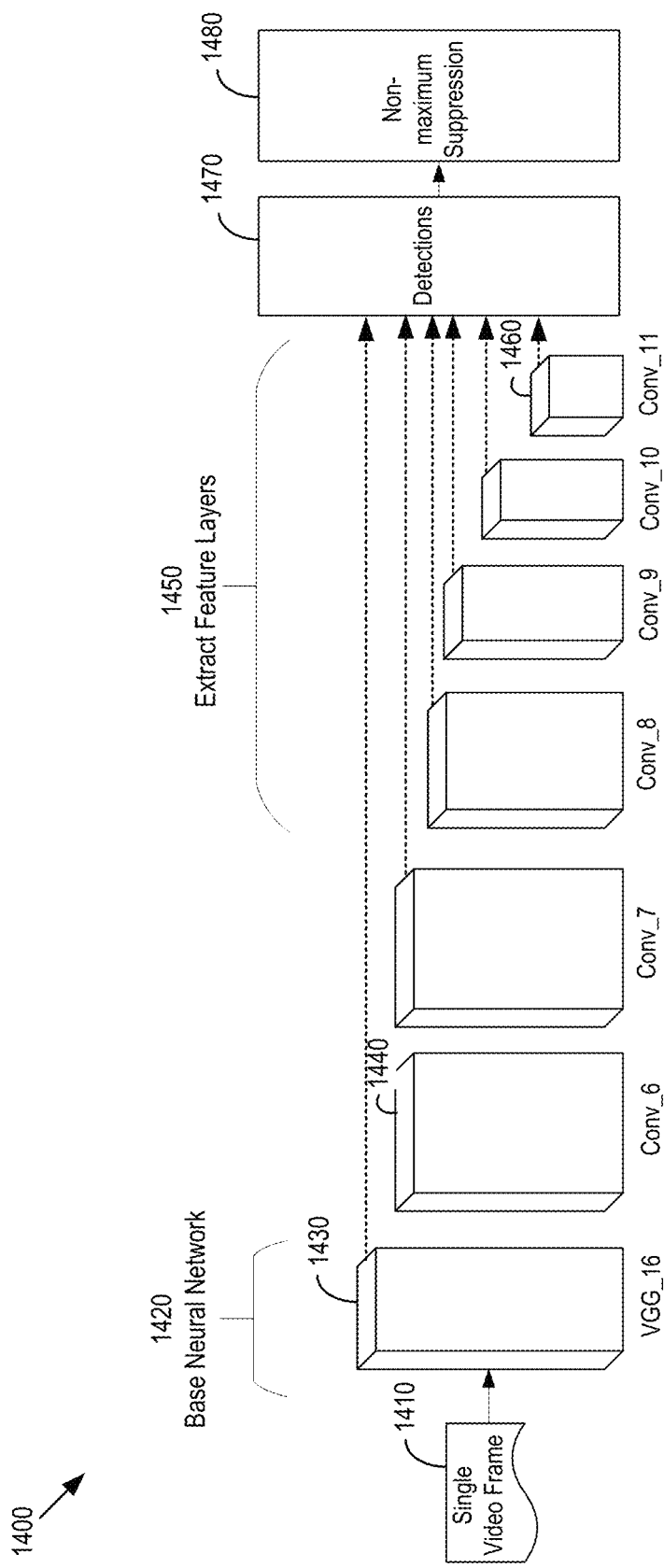
FIG. 14 shows a flow chart of an example embodiment of single shot multibox detection.
Figure 15:
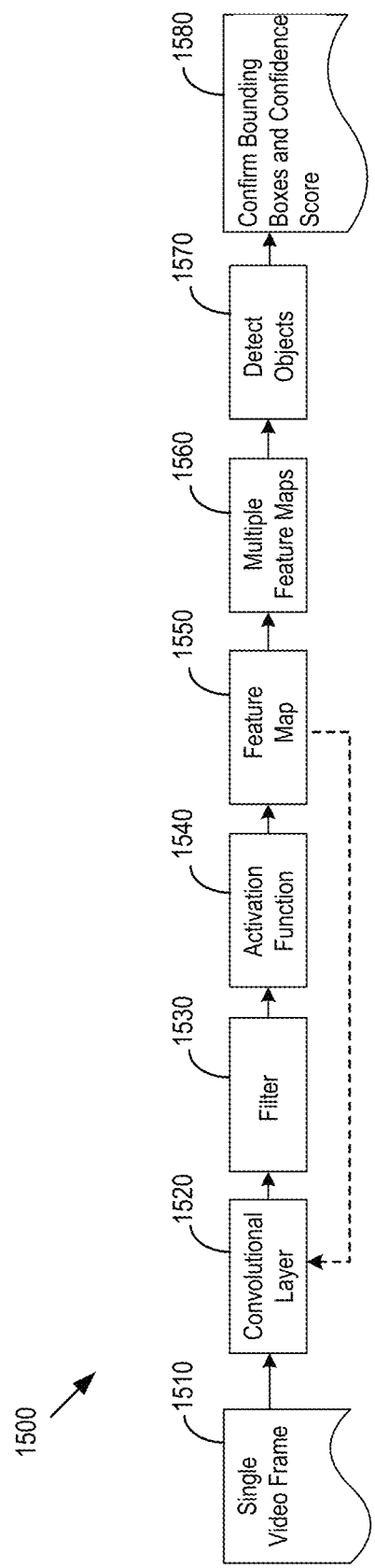
FIG. 15 shows a flow chart of an example embodiment of a convolutional neural network to accomplish computer vision for POI and OOI detection.
Figure 16:
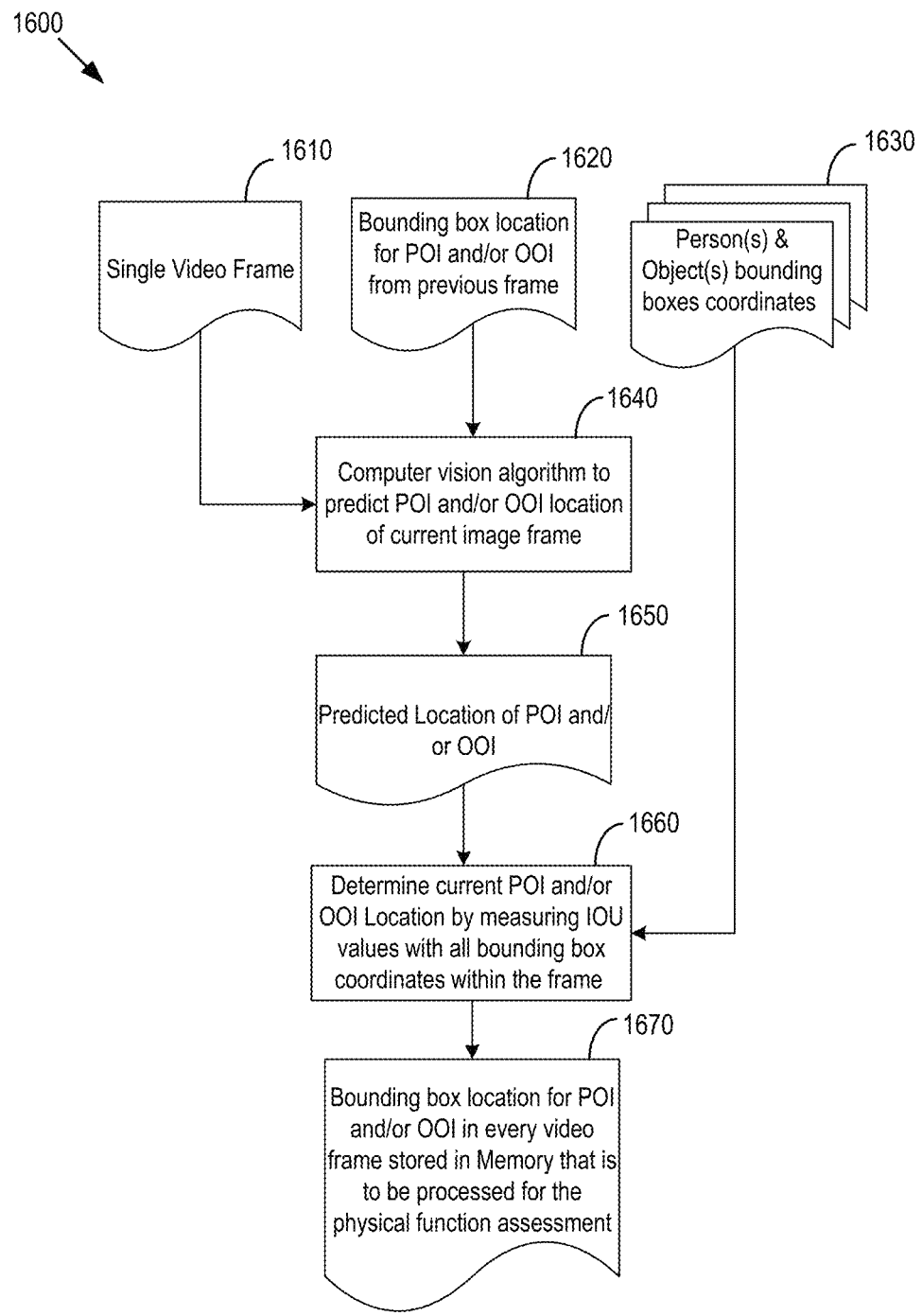
FIG. 16 shows a flow chart of an example embodiment of a method for performing POI and/or OOI tracking.
Figure 17:
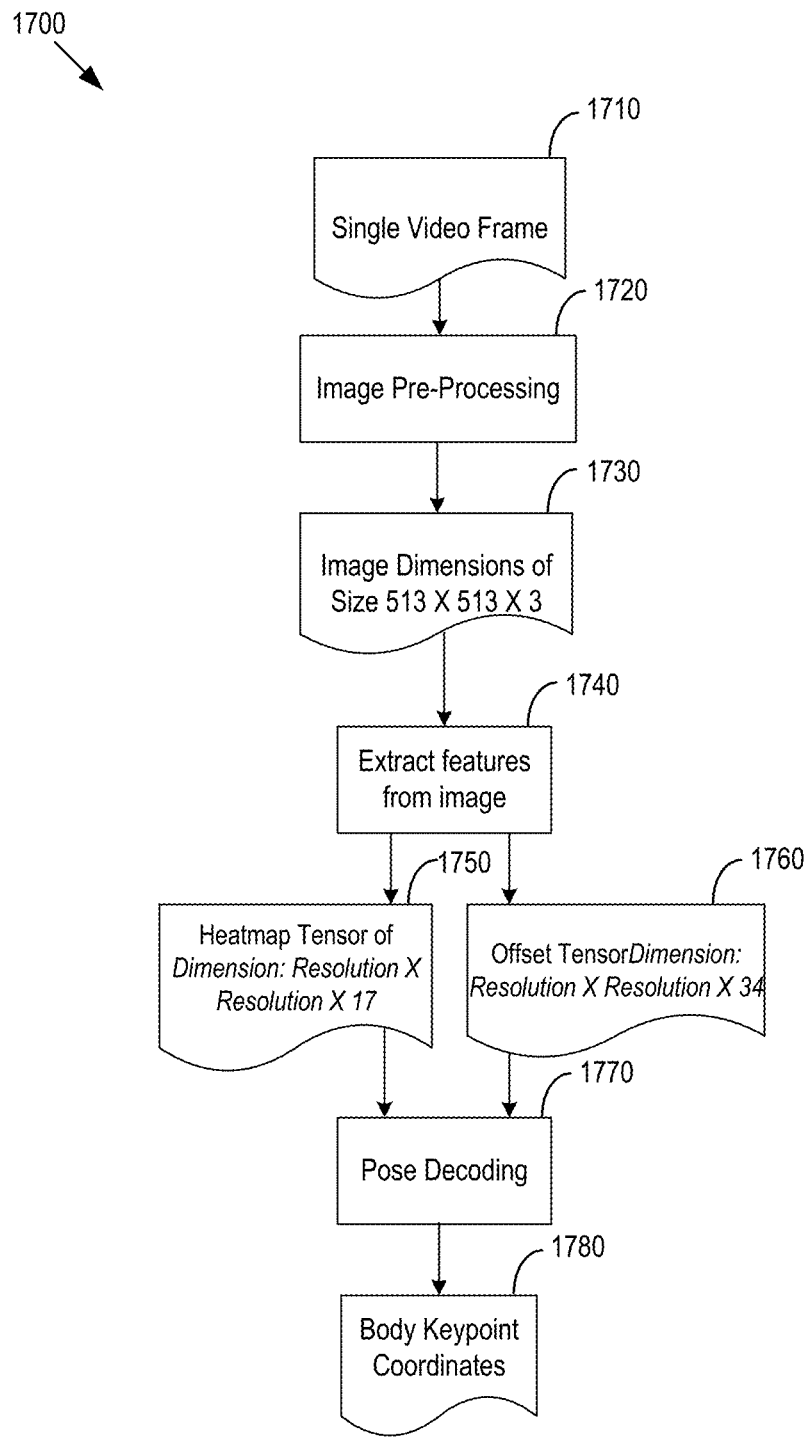
FIG. 17 shows a flow chart of an example embodiment of a method for extracting 17 different key points coordinate locations in an image.
Figure 18:
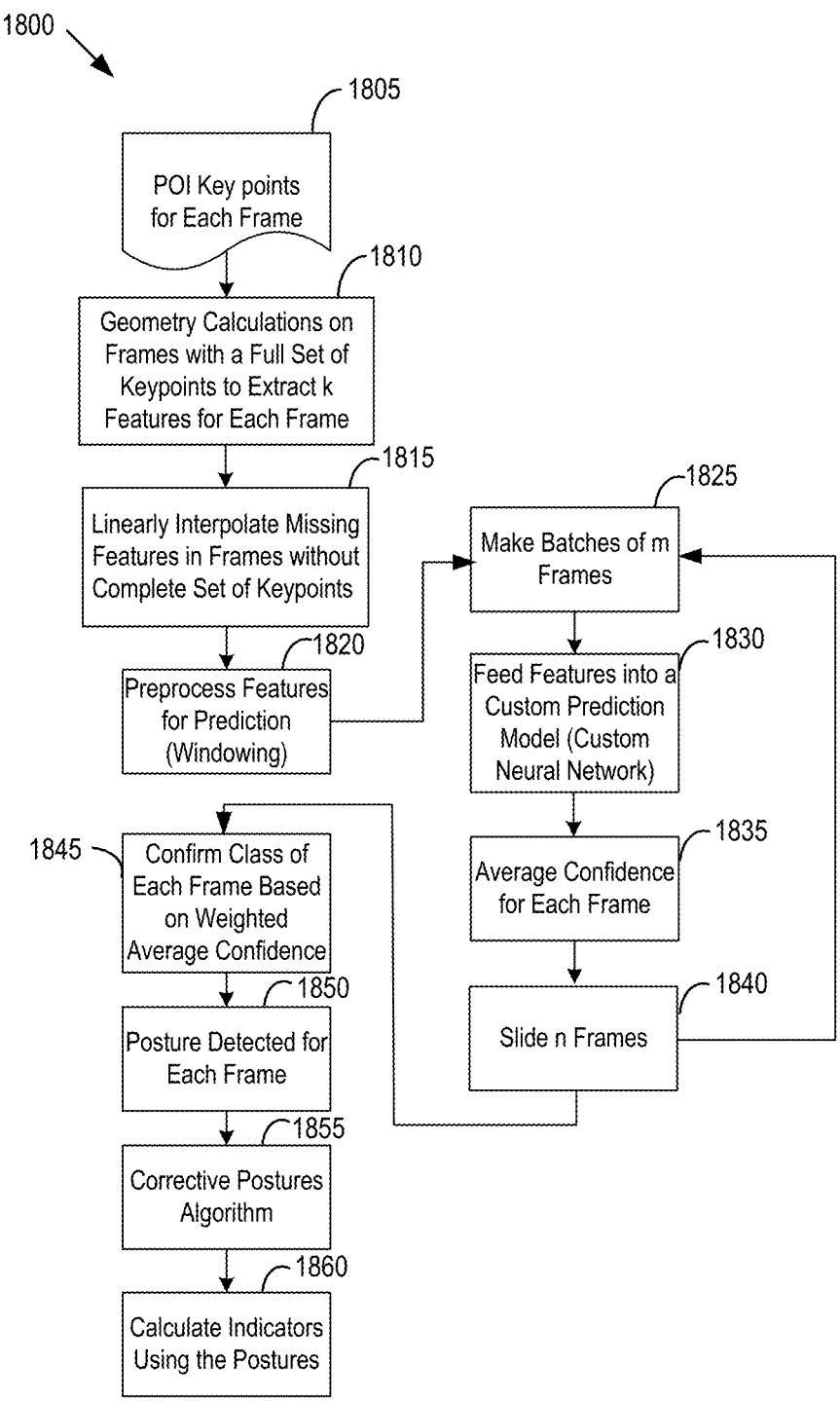
FIG. 18 shows a flow chart of an example embodiment of a method for extracting feature data from body key points for calculating physical function indicators.
Figure 19:
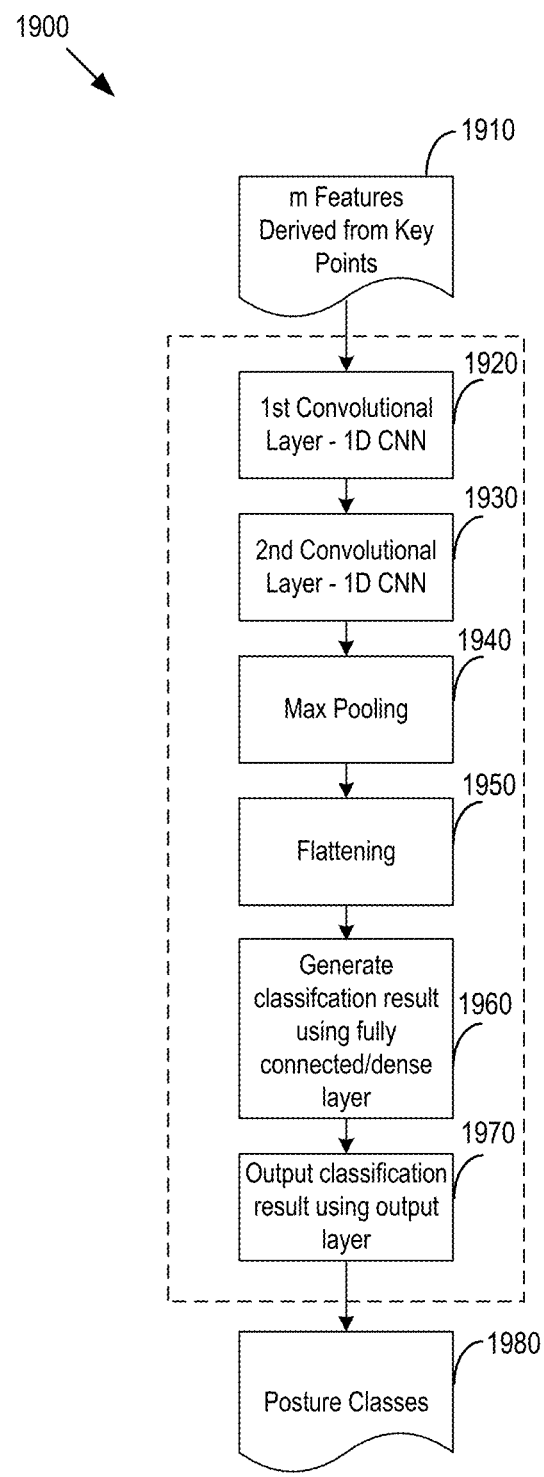
FIG. 19 shows a flow chart of an example embodiment of a method for implementing a computer vision technique using a convolutional neural network.

In at least one the example embodiments described herein, reference is made to different computer vision techniques. Unless otherwise noted, a first computer vision technique (e.g., as shown in FIGS. 14 and 15) employs a method of Person of Interest (POI) detection and Objects of Interest (OOI) detection; a second computer vision technique (e.g., as shown in FIG. 16) employs a method of person tracking; a third computer vision technique (e.g., as shown in FIG. 17) employs a method of detecting body key points; and a fourth computer vision technique (e.g., as shown in FIGS. 18 and 19) employs a method of feature extraction and posture recognition.

In another aspect, at least one example embodiment described herein includes a computer-implemented method for detecting the physical performance of a subject during physical function assessments and the method comprises: receiving an input video of a recording of the subject performing a physical function assessment (such as Timed Up and Go). The input video may be captured using a stationary camera. Frames of the input video comprise a subject or multiple persons including the subject and other objects that the subject may interact with (e.g., chair, tape). The method further includes identifying bounding boxes surrounding each person by performing the first computer vision technique (e.g., Single Shot Detector with MobileNet) on the input video; identifying a Person of Interest (POI) (i.e., the subject) and Objects of Interest (OOI) within the video frames from a user's interaction (i.e., user input) where the user (e.g., a family member of the subject, a physical therapist, a registered nurse, a registered practical nurse, a personal support worker, etc.) is performing the physical function assessment tracking the POI and OOI during at least a portion of the video duration by performing the second computer vision technique on the input video and storing the bounding box coordinates of the POI and OOI for each frame of the input video in memory; storing the video file in the memory; detecting body joint locations within each video frame by performing the third computer vision technique (e.g., with PoseNet) on the input video; correlating the detected body joints locations in each frame with the POI bounding box location stored in memory to correctly identify the POI body joints location; and storing body joint locations of the POI for each video frame in the memory.

In another aspect, at least one example embodiment described herein comprises a system for detecting the physical performance of a subject during a physical function assessment. The system comprises at least one processor and a non-transitory physical medium for storing program code that is accessible by the processor. The program code when executed by the at least one processor causes the at least one processor to receive an input video of a physical function assessment test performed by the subject where the input video is captured using a stationary camera, and frames of the input video comprise the subject or multiple persons including the subject and other objects that the subject may interact with (e.g., chair, tape); identify bounding boxes surrounding each person by performing the first computer vision technique (e.g., Single Shot Detector with Mobile-Net) on the input video; identify a Person of Interest (POI) and Objects of Interest (OOI) within the frames based on the user's interaction with the input video; track the POI and OOI during at least a portion of the video duration by performing the second computer vision technique on the input video and store the bounding box coordinates of the POI and OOI for each frame of the input video in a memory element; store the video file in the memory element; detect body joint locations within each video frame by performing the third computer vision technique (e.g., with PoseNet) on the input video; correlate body joints locations in each frame with the POI bounding box location stored in the memory element to correctly identify the POI body joints locations; and store the body joint locations of the POI for each video frame in the memory element.

In another aspect, at least one example embodiment described herein includes a non-transitory computer-readable storage medium that comprises program code stored thereon for physical function assessment, that when executed by a processor causes the processor to: receive an input video of a physical function assessment test performed by a subject where the input video was captured using a stationary camera, and frames of the input video comprise the subject or multiple people including the subject and other objects that the subject may interact with (e.g., chair, tape); identify bounding boxes surrounding each person by performing the first computer vision technique (e.g., Single Shot Detector with MobileNet) on the input video; identify a Person of Interest (POI) and Objects of Interest (OOI) within the frames based on the user's interaction with the frames; track the POI and OOI during at least a portion of the video duration by performing the second computer vision technique on the input video and store the bounding box coordinates of the POI and OOI for each frame of the input video in a memory element; store the video file in the memory element; detect body joint locations within each video frame by performing the third computer vision technique (e.g., with PoseNet) on the input video; correlate body joints locations in each frame with the POI bounding box location stored in memory element to correctly identify the POI body joints locations; and store body joint locations of the POI for each video frame in the memory element.

By utilizing a pervasive device that a large number of people already own, like a smartphone, software that can be executed by the device enables capturing a functional performance by anyone and anywhere. At least one of the example embodiments described herein can be used in different healthcare settings, including at least one of acute care (e.g., emergency departments, general hospitals), rehabilitation hospitals, long-term care homes, and community homes. At least one of the example embodiments described herein may also allow multiple people to be in the camera view during a physical function assessment, which supports flexible placement of the device, and resilience to vibration or accidental movements.

With reference to the figures, various example embodiments in accordance with the teachings herein are now described in detail.

Reference is first made to FIG. 1A, showing a block diagram of an example embodiment of a physical function assessment system 100 for generating physical function assessment recordings and performing various aspects of a physical function assessment including performance analytics. FIG. 1A provides an architectural overview of a computing device 110 that can perform various functions for generating physical function assessment recordings and assessment performance analytics. The computing device 110, which comprises at least one camera (not shown) for capturing various image and video footage of assessment performances, implements some or all of the method 120 for generating assessment performance analytics, such as at least one of mobility and balance (e.g., bed mobility, sit up, sitting, and standing balance), a range of motion test, transfer safety, fall risk, and functional change analytics. The computing device 110 may be in communication (for example, over the Internet, across a LAN, directly by Bluetooth, etc.) with another computing device 115 (e.g., a computer, a laptop, a tablet, a server, a cloud hosting service, etc.). The computing device 115 can be configured to implement some or all of method 120. Examples of computing devices 110 include, but are not limited to, dedicated or general-purpose hardware, desktop computers, single board computers, and mobile devices such as smartphones, tablets, laptops, smart watches, and the like. The various example system embodiments described above may be implemented using the computing device 110 and/or the computing device 115.

In some embodiments, computing device 110 is used for image capturing alone, such as with a point-and-shoot camera or a high-end single-lens reflex camera, while the method 120 is implemented separately in one or more connected hardware devices. In this sense, the computing device 110 and other devices for a system may be used for performing physical function assessment in accordance with one or more of the various teachings herein. In other words, the method 120 may be implemented directly on computing device 110, or may be implemented in software or hardware connected to the computing device 110, such as computing device 115. For example, in some embodiments, the method 120 can be implemented using a distributed system, where detection, tracking, and analysis services are implemented on physically or logically separate devices. In some embodiments, one or more portions of the method 120 may be hosted and performed using cloud computing.

Figure 8:
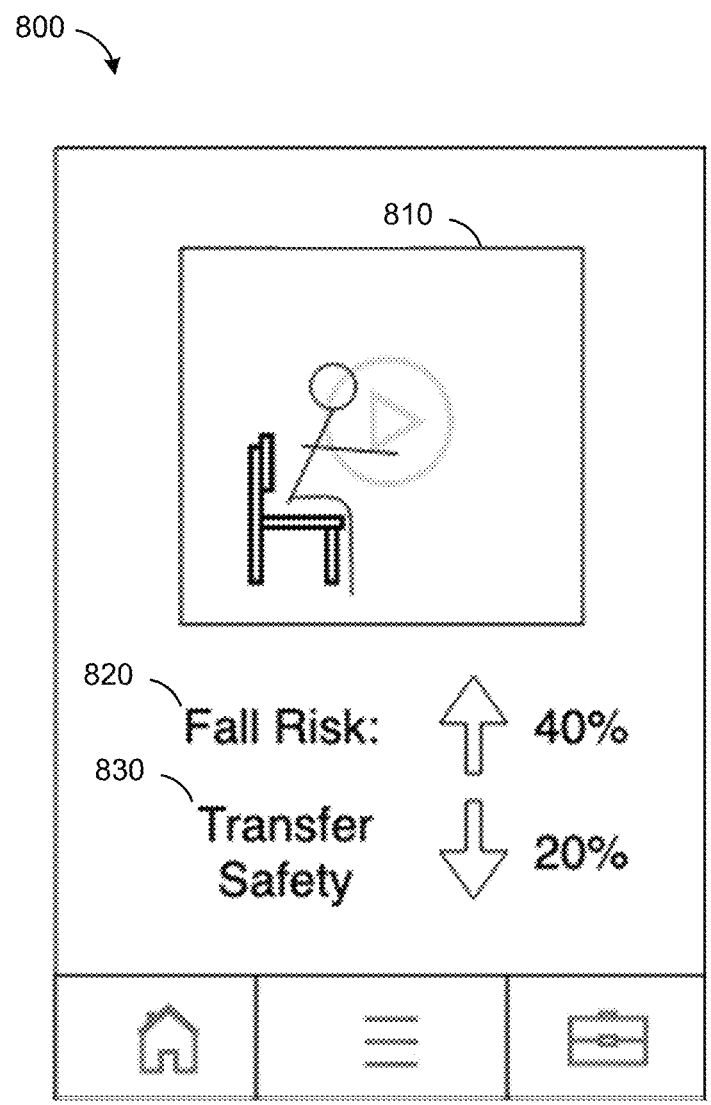
FIG. 8 shows a screen capture of an example overview of the latest assessment analysis result after a physical function assessment has been completed.
Figure 9:
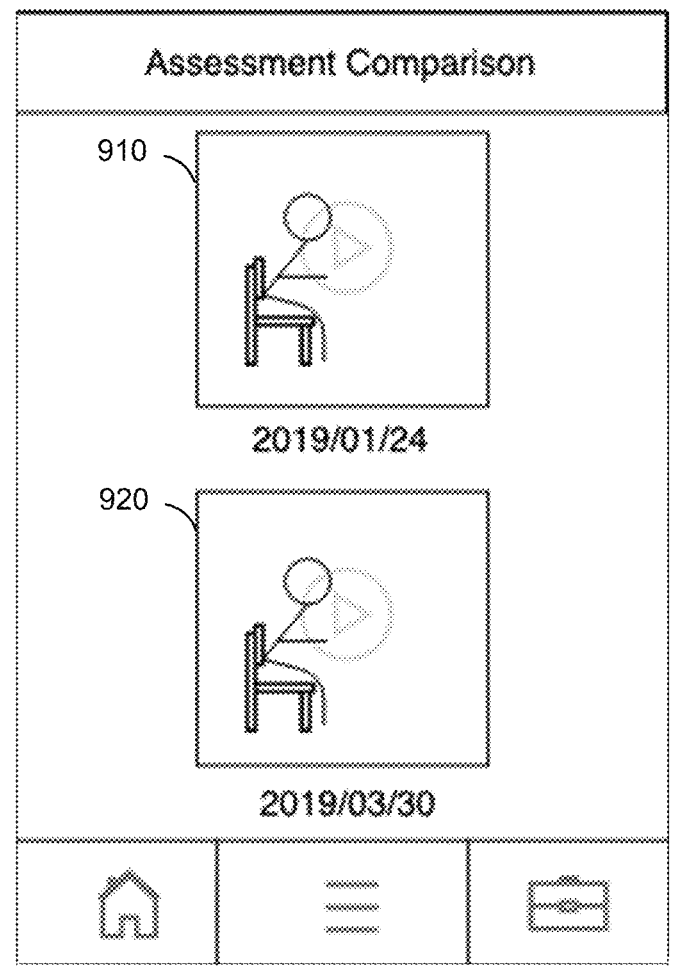
FIG. 9 shows a screen capture of an exemplary video-by-video comparison interface which contains two different assessments.

Examples of functions performed by the system 100 include retrieving assessment recordings or videos recorded by the computing device 110 from local memory or from a remote database. Generally, "receipt," "retrieval," or "access" to or of a video recording refers to the actions of performing read and/or write operations to the saved video content in memory, with or without explicit graphical displays on a display device such as a touch screen. The method 120 may be implemented by executing one or more modules for identifying a Person of Interest (POI) and objects 121, tracking the POI during the whole test duration 122, detecting posture and posture transitions 123, detecting gait parameters 124, calculating various time parameters such as test completion time 125, calculating physical function indicators 126, and generating assessment analytics 127, where assessment analytics data may be based on at least one of gait measurements, various posture and/or posture transition measurements, and time results. The assessment analytics may be displayed and/or stored in the form of additional graphical and/or numerical data. In addition, the method 120 may involve splitting an assessment recording into segments that associate the most with fall risk, and/or transfer safety (e.g., as shown in FIG. 8), etc., and show the most obvious changes compared to previous assessments (e.g., as shown in FIG. 9).

Figure 1B:
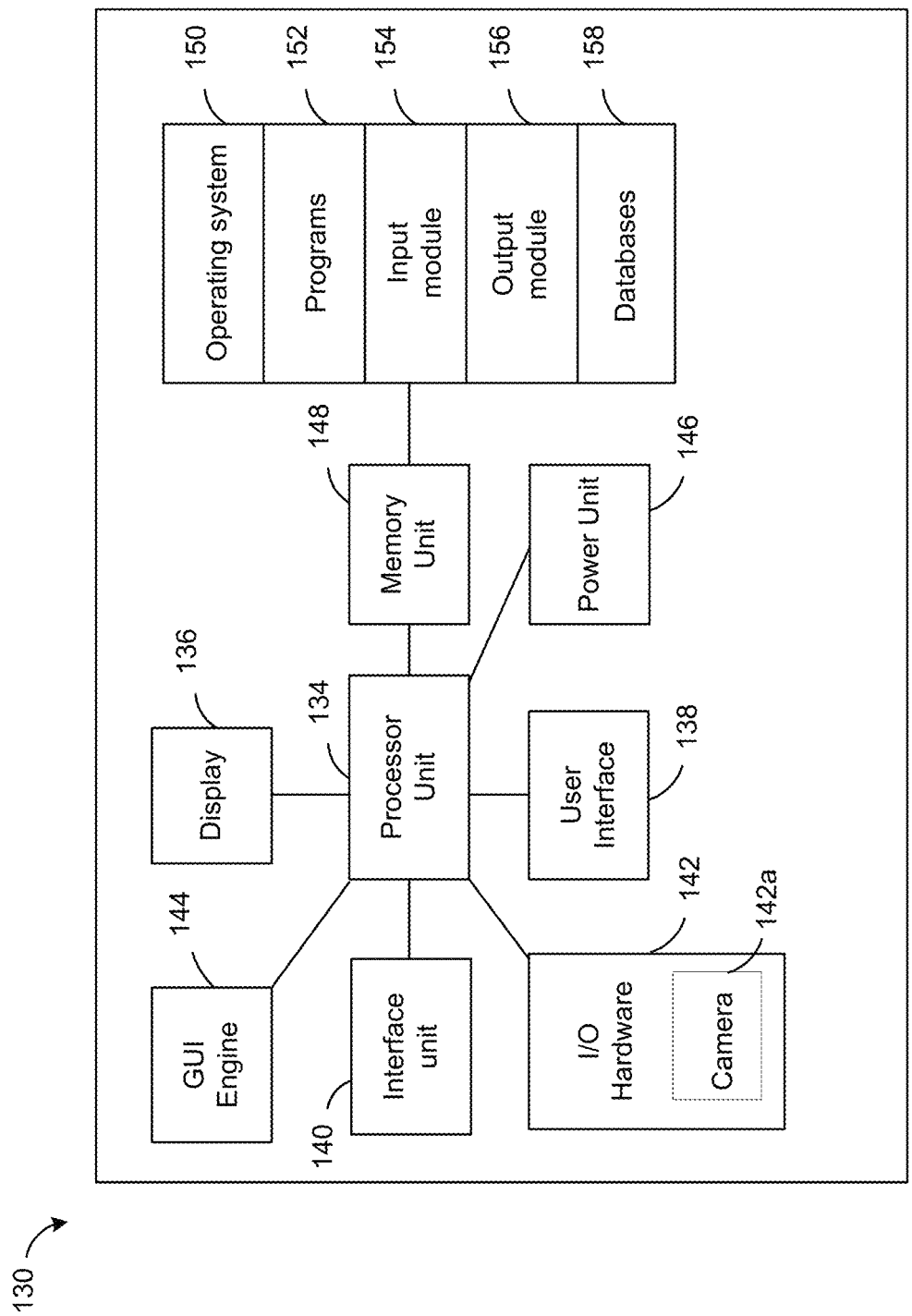
FIG. 1B illustrates an example embodiment of device that can be used to perform the physical assessment testing described herein.

Referring now to FIG. 1B, shown therein is a block diagram of an example embodiment of a device 130 that can be used to perform the various functions for the physical assessment testing described herein. Accordingly, the device 130 is an example of the computing device 110 or the computing device 115. The device 130 includes a processor unit 134, a display 136, a user interface 138, an interface unit 140, input/output (I/O) hardware 142 having a camera 142a, a Graphical User Interface (GUI) engine 144, a power unit 146, and a memory unit (also referred to as "data store") 148. In other embodiments, the device 130 may have more or less components but generally function in a similar manner.

The processor unit 134 controls the operation of the device 130 and can be any suitable processor, controller, or digital signal processor that can provide sufficient processing power depending on the configuration, purposes, and requirements of the device 130 as is known by those skilled in the art. The processor unit 134 may include one processor. Alternatively, there may be a plurality of processors that are used by the processor unit 134, and these processors may function in parallel and perform certain functions. In alternative embodiments, specialized hardware can be used to provide some of the functions provided by the processor unit 134.

The processor unit 134 can execute the graphical user interface (GUI) engine 144 that is used to generate various GUIs, some examples of which are shown and described herein, such as in FIGS. 2A-7. The GUI engine 144 provides data according to a certain layout and also receives inputs from a user. The processor unit 134 then uses the inputs received by the GUI from the user to change the operation of the various tests that may be performed in accordance with the teachings herein, to change data that is shown on the display 136, or to show a different GUI.

The display 136 can be any suitable display that provides visual information depending on the configuration of the device 130. For instance, the display 136 may output the various GUIs that are generated by the GUI engine 144. The display 136 may be, but not limited to, a computer monitor or an LCD display depending on the implementation of the electronic device (i.e., if the device 130 is a smartphone, a tablet, a laptop, or a desktop computer).

The user interface 138 can include at least one of a mouse, a keyboard, a touch screen, a thumbwheel, a track-pad, a track-ball, a card-reader, voice recognition software, and the like again depending on the particular implementation of the device 130. In some cases, some of these components can be integrated with one another.

The interface unit 140 can be any interface that allows the device 130 to communicate with other devices or computers. In some cases, the interface unit 140 can include at least one of a serial port, a parallel port, or a USB port that provides USB connectivity. The interface unit 140 can also include at least one of an Internet, Local Area Network (LAN), Ethernet, FireWire, modem, or digital subscriber line connection. For example, the interface unit 140 can include a standard network adapter such as an Ethernet or 802.11x adapter. The interface unit 140 may include a radio that communicates utilizing CDMA, GSM, GPRS, or Bluetooth protocol according to standards such as IEEE 802.11a, 802.11b, 802.11g, or 802.11n. Various combinations of these elements can be incorporated within the interface unit 140.

The I/O hardware 142 is optional and can include, but is not limited to, at least one of a microphone, a speaker, and a printer, for example, depending on the implementation of the device 130. The I/O hardware 142 includes a camera 142a that can be used to obtain the video frames of a subject performing a certain physical function test.

The power unit 146 can be any suitable power source that provides power to the device 130 such as a power adaptor or a rechargeable battery pack depending on the implementation of the device 130 as is known by those skilled in the art.

The memory unit 148 can include RAM, ROM, one or more hard drives, one or more flash drives, or some other suitable data storage elements such as disk drives, etc. The memory unit 148 may store the program instructions for an operating system 150, program code 152 for various applications, an input module 154, an output module 156, and the database 158. The programs 152 comprise program code 152 that, when executed, configures the processor unit 134 to operate in a particular manner to implement various functions, tools, processes, and methods for the device 130. For example, the program code may include software instructions for various methods and neural networks described in accordance with the teachings herein examples of which are shown in FIGS. 1A and 12 to 19. The memory unit 148 may also store various operational parameters, video recordings, images, and/or test results in the database 158.

While the remainder of the description will be described in terms of the device 130 performing various functions, this is for ease of description since at least one of the computing device 110 and the computing device 115 can be used to perform the various functions described herein.

Referring now to FIGS. 2A-2F, shown therein is an example list of screen captures 200A-200F representing an ongoing video recording of a physical function assessment that is being performed by the device 130. The device 130 starts to record video for a physical function assessment based on input from a user (e.g., a clinician, a family member) such as, for example, the user selecting a start button on a graphical user interface. This may be done by the user touching the start button on a touch sensitive display or using a mouse or other input device to select the start button, depending on how the device 130 is implemented. A timer is started from 0 seconds to indicate the time elapsed since the beginning of the physical function assessment. Once the start button is selected, the subject can start to perform a physical function assessment that may be predefined or selected by the user. The screen captures 200A-200F show a physical function assessment called "Timed Up and Go", where the subject starts from a sitting position, stands up, walks straight for 3 meters, turns around, walks back to the chair, and sits on the chair again to complete the whole test. The recording is stopped by the user selecting the Finish button once the subject has completed the movements for the physical function assessment. The physical function assessment can be a standardized test that clinicians use to assess the physical function or mobility of subjects.

In current clinical practice, a clinician must stand beside the subject and use a timer to time the test completion time. Clinicians then compare the completion time with a clinically validated time threshold (e.g., 12 seconds is used by some clinicians) to evaluate the physical function and estimate the fall risk of the patient. The device 130 can automatically detect the start time and the end time of the assessment, calculate the completion time, and compare with a clinical standard to give a result. In other physical function assessments, the result evaluation criteria can be different than the total completion time, such as body transfer difficulty for a transfer test. The device 130 can record and analyze various criteria in different physical function assessments.

Each video recording includes at least one physical function assessment test. The recording may be split into individual video clips, each covering a duration including some movements that are associated with at least one functional indicator such as mobility, balance, body posture transition, transfer, or the movements that show minimal clinically important changes from previous assessments. In some embodiments, the recording may be compressed in storage size by changing video storage format to save storage space when stored in the memory unit 148 of the device 130. Furthermore, in at least one embodiment, a list of video clips may be filtered, either during the clip generation process, or over the display screen via an icon, according to predefined or user-selected criteria. Similarly, abbreviations may be provided on each thumbnail to indicate the name of the subject who is performing the physical function assessment. In addition, in some embodiments the video clips may be ordered chronologically.

Figure 3:
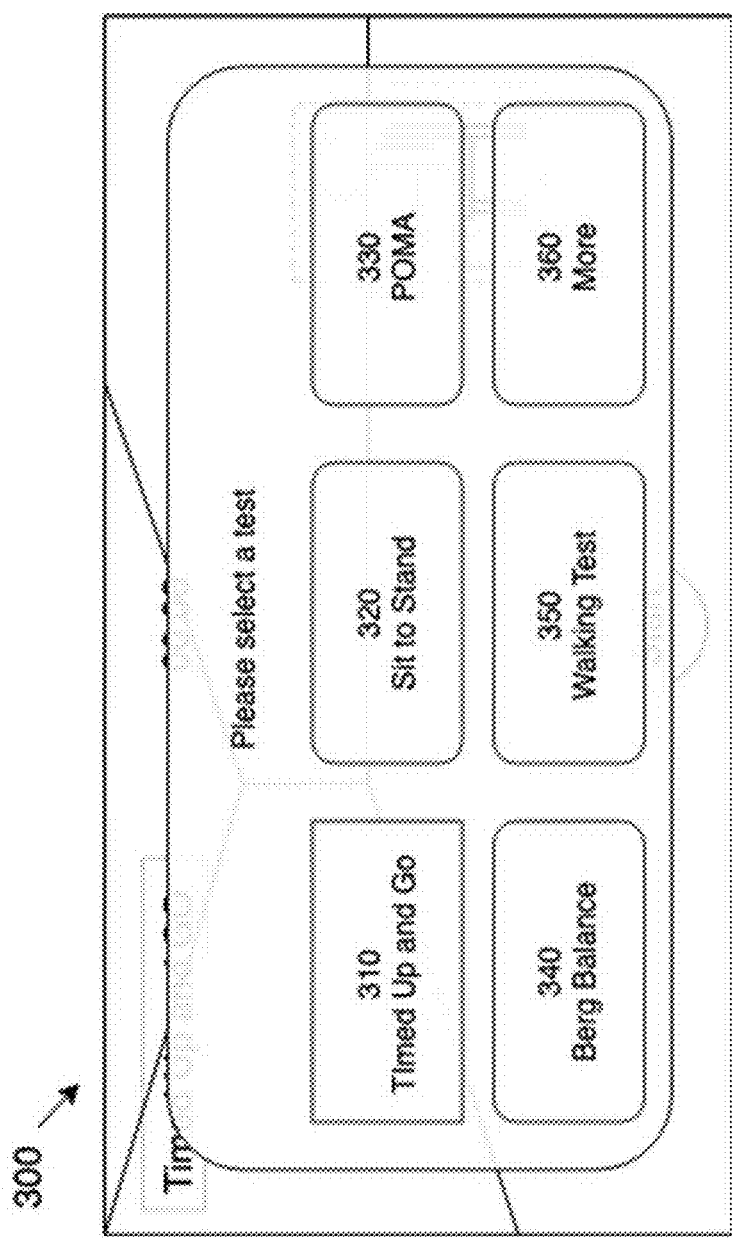
FIG. 3 shows a screen capture of an example assessment selection interface with a group of buttons for each of the assessments (or tests) that may be selected.

Referring now to FIG. 3, shown therein is an example embodiment of an assessment selection interface 300 with a group of buttons for each of the assessments (or tests) that may be selected, namely Timed Up and Go 310, Sit to Stand 320, Performance Oriented Mobility Assessment (POMA) 330, Berg Balance 340, Walking Test 350, and More 360 (e.g., bed mobility, transfer between surfaces such as a bed, a chair, or a wheelchair, short physical performance battery protocol, etc.). A user can select one assessment by clicking one of the buttons, and the computing device 110 enters into the specific setup for that particular assessment and post assessment analysis.

Figure 4:
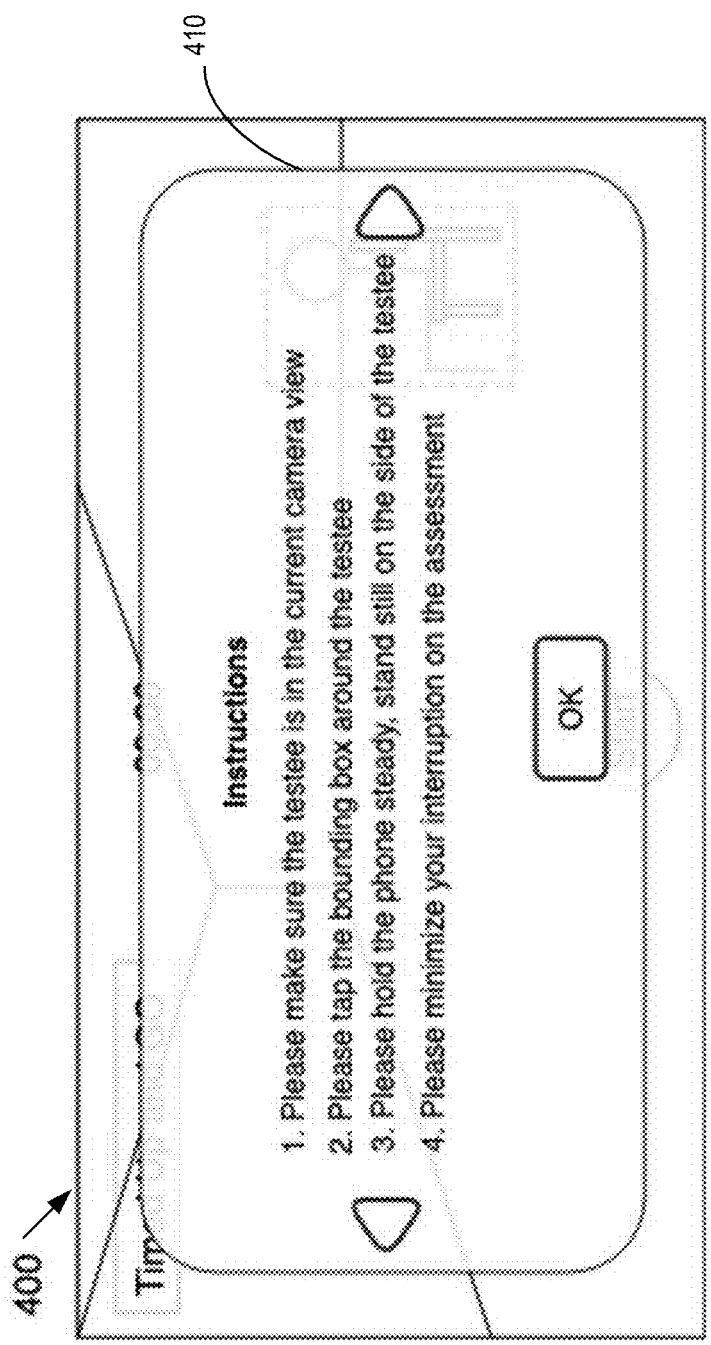
FIG. 4 shows a screen capture of an example pre-test instruction interface that lists instructions that the user may pay attention to during the test.

Referring now to FIG. 4, shown therein is an example embodiment of a pre-test instruction interface 400 that lists instructions 410 that a user of the device 130 should pay attention to during the test. The instructions include, but are not limited to, phone setup, system operations, and reminders to testers.

Figure 5:
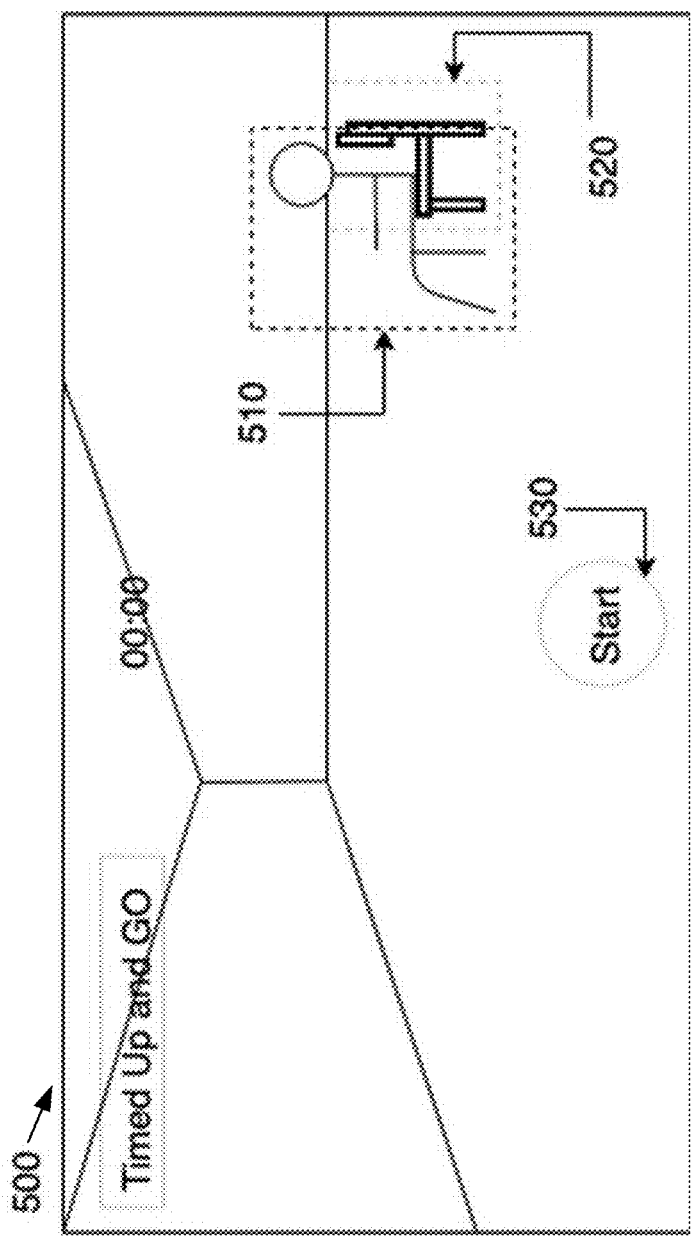
FIG. 5 shows an example screen capture of the pre-start of a real-time recording of a physical function assessment.

Referring now to FIG. 5, the screen capture 500 shows the pre-start of a real-time recording of a physical function assessment. The device 130 not only automatically detects people 510 in the camera view and objects 520 such as a chair with a bounding box surrounding each detected item, but also provides the option of having the user select the POI and the OOI or verify the locations of these objects visually and adjust if necessary before the assessment recording is started when the user selects the start button 530. The device 130 can also detect if the POI is in a correct starting position based on the particular physical function test that is being performed. In some embodiments, the assessment is not started until the correct starting position is detected. In this example, the POI performing a physical function assessment can be identified, for example, through the processes discussed with reference to FIG. 16. Although not shown explicitly, in some embodiments, the gait and posture of the subject and the time elapsed may be indicated or displayed on screen as well.

Figure 6:
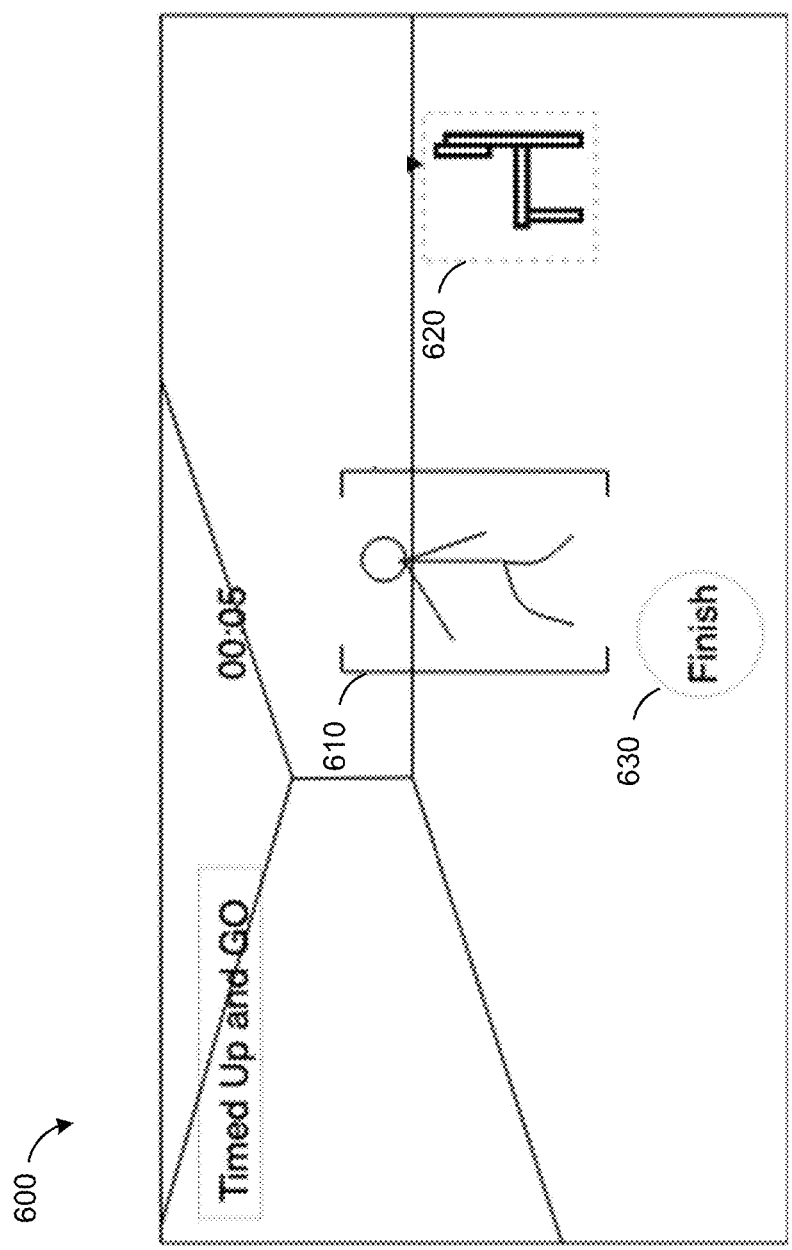
FIG. 6 shows an example screen capture of a video of an ongoing physical function assessment.

Referring now to FIG. 6, shown therein is a screen capture of an example video of an ongoing physical function assessment (e.g., selected from the various options in FIG. 3). A window 600 shows a view with a POI 610 performing a physical function assessment (e.g., Timed Up and Go) while being recorded by the device 130. The OOI 620 (e.g., a chair) is detected during the whole recording. The video recording may also be stopped when the user selects control icons 630 (e.g., "Finish") shown in the window 600. Other options may be provided to allow the user to pause the recording session, to reinitialize the test selection, to perform a setup process, and/or to continue the recording process but with display assessment statistics instead of assessment recordings on the screen. In some embodiments, after an assessment is done, a video recording of the assessment process may be generated automatically where the entire assessment performance is included.

Figure 7:
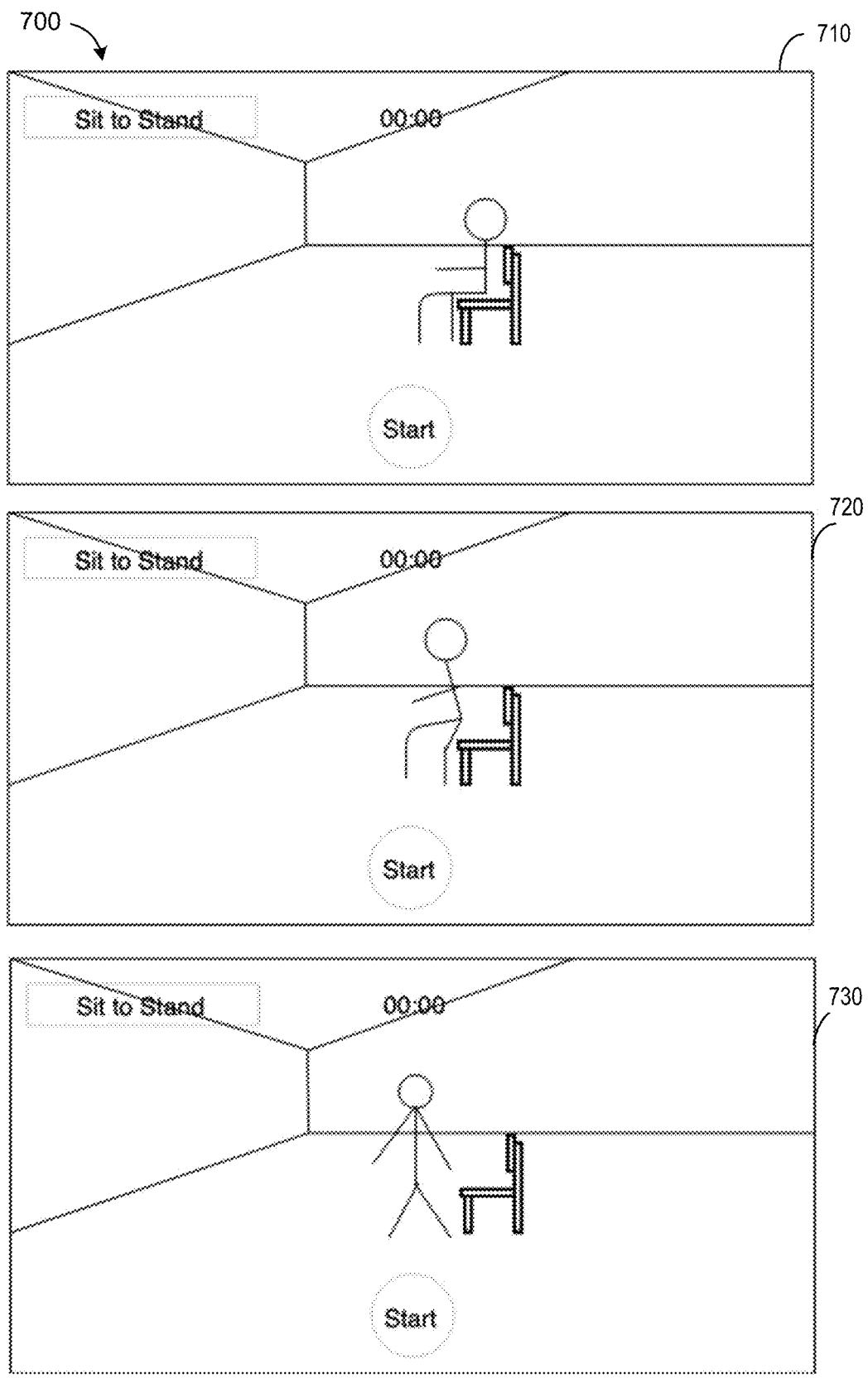
FIG. 7 shows an example list of thumbnails representing another physical function assessment.

Referring now to FIG. 7, shown therein is an example list of thumbnails representing video clips or segments of a physical function assessment 700 obtained by the computing device 110. In FIG. 7, the assessment is named Sit to Stand, where a patient starts from a sitting position as shown in image 710, begins to stand up as shown in image 720, is in the standing position as shown in image 730, and then sits back on the chair. The subject may perform these movements a number of times, such as five times, for example, in order to complete the test. Traditionally, a clinician stands beside the subject and uses a timer to time how long it takes the subject to complete a desired number of times to move from the sitting position to the standing position and back to the sitting position. The device 130 automatically detects and timestamps the start and the end of the test, and then calculates the total completion time. One result of the Sit to Stand test is the total completion time. There exists clinically used time thresholds to indicate a healthy or a problematic physical function by comparing the actual total completion time to the threshold.

Referring now to FIG. 8, shown therein is a screenshot 800 of an example overview of the latest assessment analysis result after a physical function assessment has been completed. The overview page shows the latest assessment video 810 and values for the most clinically relevant indicators such as, but not limited to, fall risk 820 and/or or transfer safety 830, where the values are generated from the latest assessment.

Referring now to FIG. 9, shown therein is an example video-by-video comparison interface 900 which contains two videos and/or screen shots of different assessments, an earlier assessment 910 and a later assessment 920, that can be compared to one another by replaying the videos and/or screen shots of the different assessments. Individual per-assessment video clips may be selected on the screen (e.g., as shown in FIGS. 6 and 7) for further review by the user. The interface 900 may also show the date on which the assessments were performed as well as the name of the subject who performed the assessment.

Figure 10:
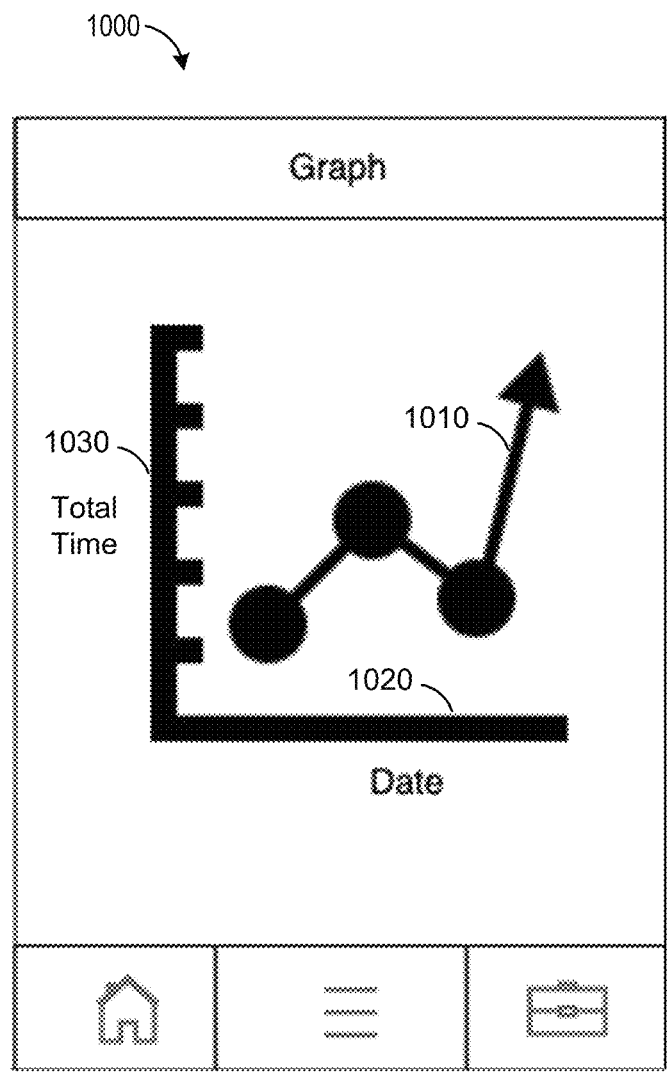
FIG. 10 shows a screen capture of an example assessment graph showing the results of multiple assessments.

Referring now to FIG. 10, shown therein is an example assessment graph 1000 where all past assessment results are plotted to form a curve 1010 by using date as x-axis 1020 and some performance metric, such as total completion time, as y-axis 1030. In this way, the graph reveals the progress in a person's physical function measured by assessment performance over time (e.g., using a certain time interval such as days, weeks, months, or years).

Figure 11:
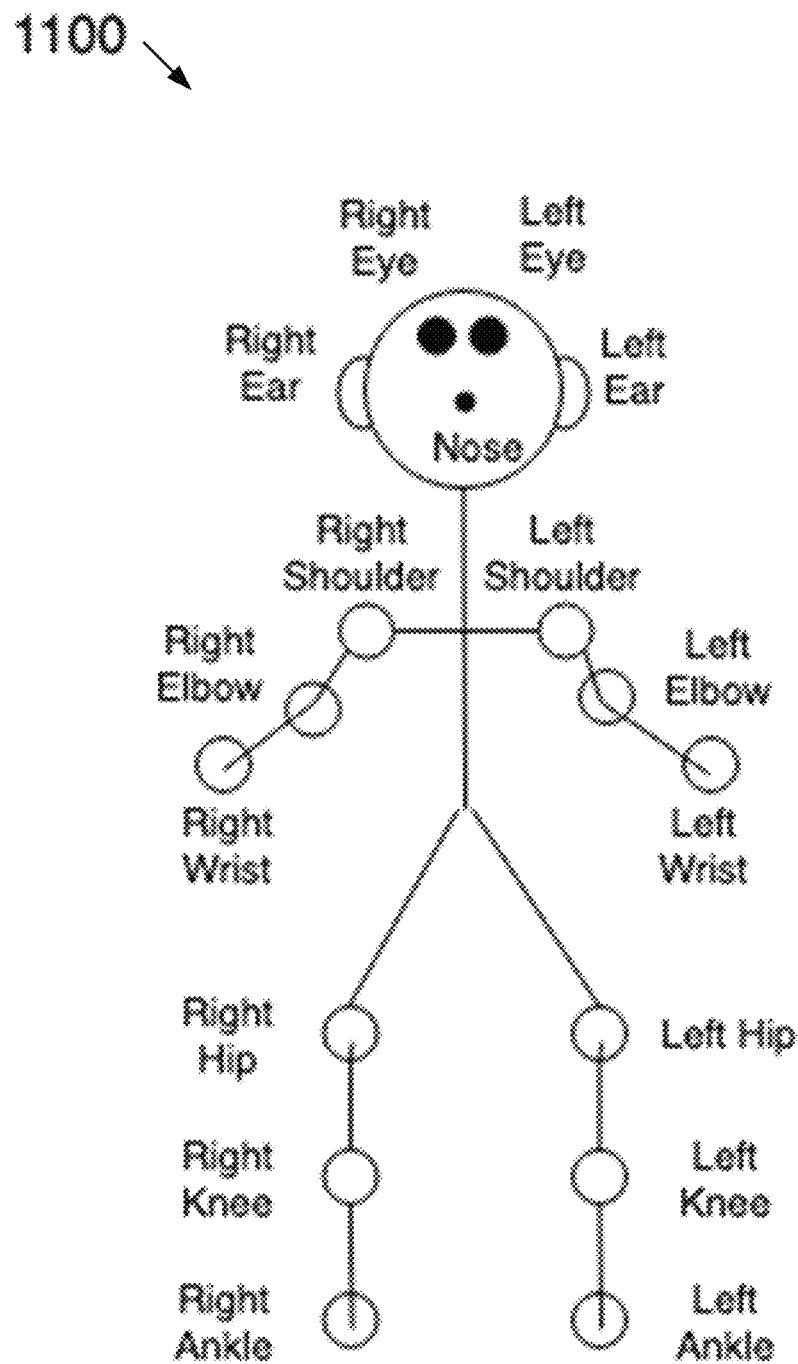
FIG. 11 shows a diagram illustrating an example of a human body and 17 key joints on the body that can be used for assessment analytics.

Referring now to FIG. 11, shown therein is a diagram illustrating an example human body 1100 and a number of key points on the body 1100 that the computing device 110 is able to detect and use for assessment analytics. In this example embodiment, 17 key points may be used but in other embodiments, and potentially depending on the actual type of physical function assessment being done, another number of key points may be used or a subset of the 17 key points shown in FIG. 11 may be used. The computing device 110 can execute software code to detect 17 key points, or a subset of the 17 key points depending on the assessment, on the body of a POI and the coordinates of each of the detected key points in each video frame by performing the third computer vision technique (e.g., as shown in FIG. 22) on the input video. Key points and the coordinates of each key point in the frame can be stored in the memory of the device 130. By tracking the changes in the coordinates of the key points on the POI's body during the entire video, the device 130 allows accurate calculation of gait, postures, and time parameters related to the performance of the assessment.

The methods 1300 to 1900 shown in FIGS. 13 to 19 will now be described. It should be noted that any of the methods 1300 to 1900 may be performed by the computing device 110, computing device 115 or the device 130, for example, by a processor of one of these devices, such as the processing unit 134 of the device 130, which executes program code. For ease of illustration, the implementation of the methods 1300 to 1900 is described with reference to the device 130.

Figure 12:
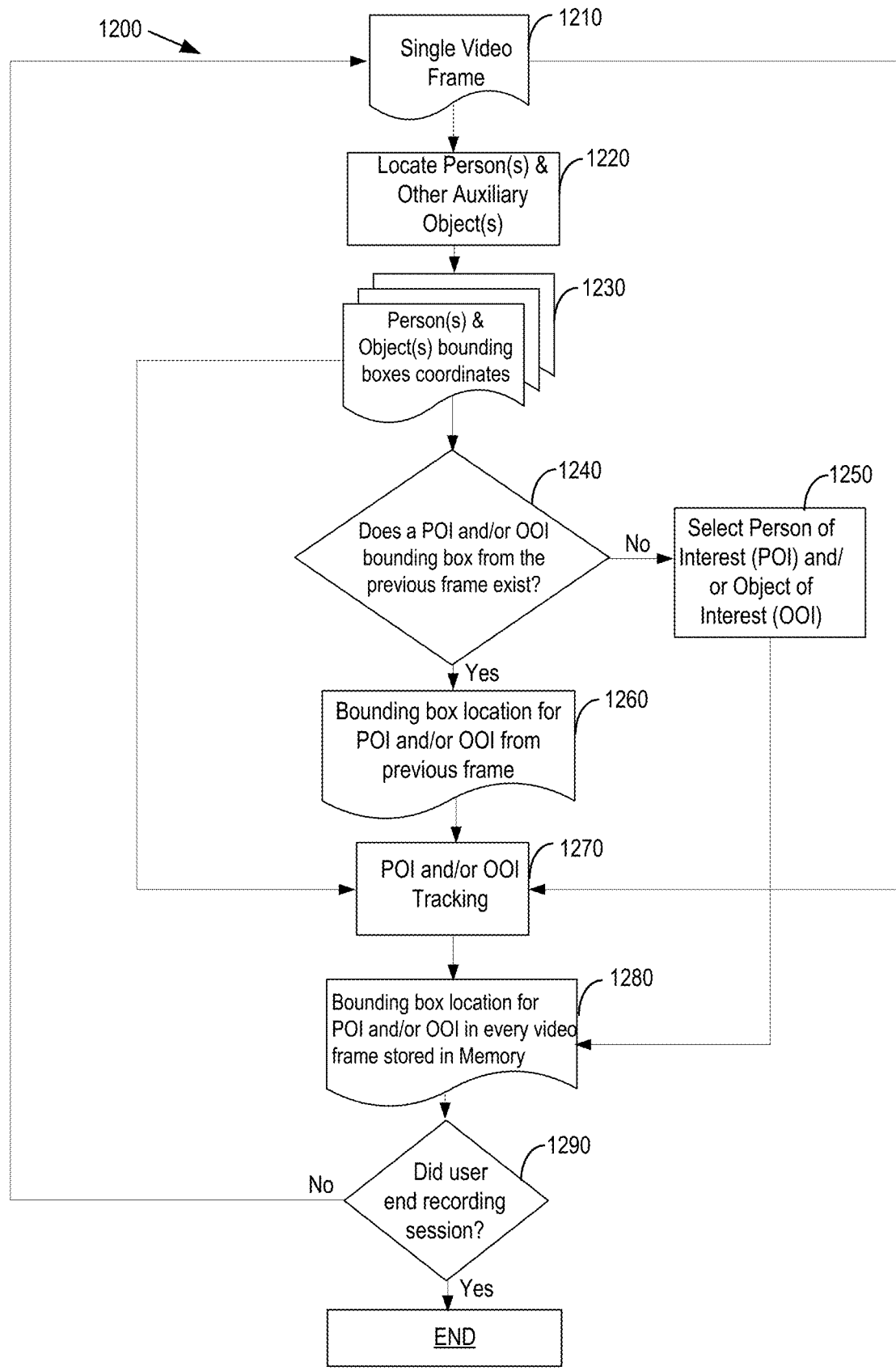
FIG. 12 shows a flow chart of an example embodiment of a method for Person of Interest (POI) and/or Object of Interest (OOI) selection that may be done during physical assessment.

Referring now to FIG. 12, shown therein is a flow chart of an example embodiment of a method 1200 for performing selection of a Person of Interest (POI) and/or Object of Interest (OOI). The method 1200 starts with a single video frame and ends after the user ends the recording session. This method 1200 takes place in real time where user interaction and attentiveness may be required at every frame.

At 1210, the device 130 extracts input video frames from the camera that is used by the device. This may be done by the processing unit 134 of the device 130 sending instructions to fetch video data from the camera in the I/O hardware 142. The fetched video data can then be stored in the memory unit 148, which can be RAM and/or ROM. The processing unit 134 can then perform various functions on the fetched video data as described below.

At 1220, the device 130, given the input video frames that were extracted/obtained from the camera of the computing device 110, one or more person(s) and/or object(s) are detected within each video frame. This may be done by executing the one or more modules for identifying a Person of Interest (POI) and objects 121 shown in FIG. 1A.

At 1230, the device 130 associates bounding box coordinates relative to the image dimension with each object. This can be achieved by running an Object Detection technique, such as, but not limited to, a single shot multibox detection, You Only Look Once (YOLO), Faster R-CNN, or Fast R-CNN, for example.

In at least one embodiment, a bounding box coordinate has 4 properties, namely Xmin, Ymin, Xmax, and Ymax. The image coordinate system is set up with the origin in the top left portion of the image. The coordinate system increases in the y-direction as it goes down, and increases in the x-direction as it moves to the right. The property Xmin represents the x minimum of the bounding box. The property Ymin represents the y minimum of the bounding box. The property Xmax represents the x maximum of the bounding box. The property Ymax represents the y maximum of the bounding box. With the 4 properties combined, the device 130 can define a rectangular region within an image that encapsulates some information that the device 130 is instructed to monitor or follow.

At 1240, the device 130 checks if a POI and/or OOI has been previously initialized. If the answer is Yes (i.e., a POI and/or OOI has been previously initialized), then the method 1200 proceeds to 1260. If the answer is No (i.e., a POI and/or OOI has not been previously initialized), then the method 1200 proceeds to 1250.

At 1250, the device 130 receives user input to establish a POI and/or OOI relationship, for example, by having the user tap into the bounding box coordinates of the potential POI and/or OOI candidates displayed visually on the display 136 of the device 130. A projection operation can be used to translate the location of the tap from screen coordinates, based on screen dimensions of the device 130, into the coordinate system that was used to output the location of the bounding boxes which depends on the camera resolution of the device 130. A logical based program can then be used to identify whether the projected tapping coordinate falls within any of the bounding boxes, and the respective bounding box is chosen either as the POI or the OOI. The POI and/or OOI bounding box associated with the current frame is then saved in memory and can be used as an initialization point for the tracking done in the next consecutive video frames. In at least one implementation, act 1250 is optional, meaning that if the POI and/or OOI bounding box does not exist yet in the previous frame, then the device 130 will perform act 1250. In such an implementation, the user of the device 130 may make such a determination at act 1240.

At 1260, the device 130 obtains the bounding box location for the POI and/or OOI from the previous video frame.

At 1270, the device 130 uses the selected POI from the previous video frame as an initialization point for tracking the subject.

At 1280, the device 130 saves into the memory unit 148 the determined POI and/or OOI bounding box coordinates associated with every video frame.

At 1290, the device 130 checks if the user has ended the current recording session. This may be done through the application interface by having the user tap or otherwise select a Finish button (e.g., via control icon 630). If the answer is Yes (i.e., the user has ended the current recording session), the method 1200 ends. If the answer is No (i.e., the user has not ended the current recording session), the method 1200 returns to 1210.

Figure 13:
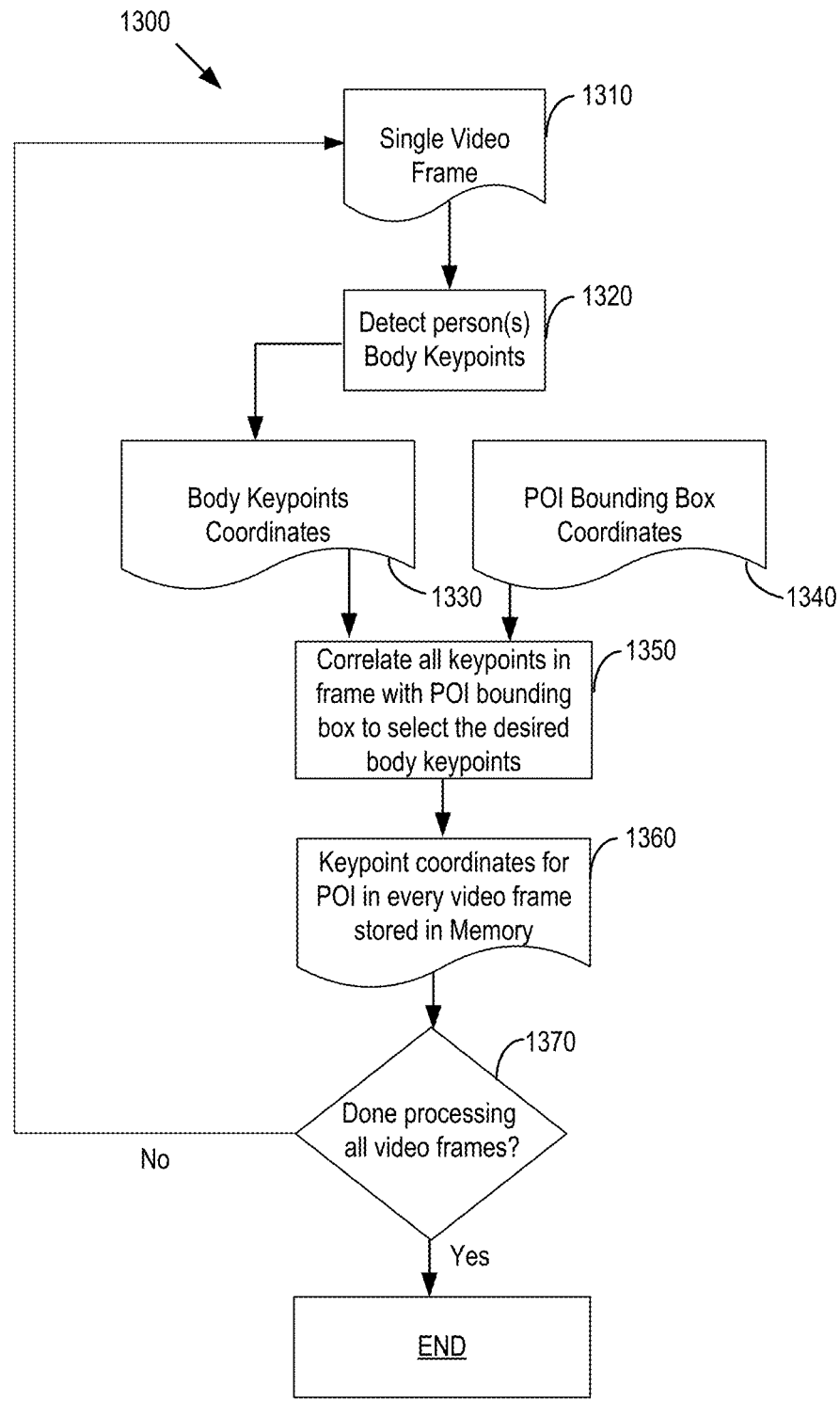
FIG. 13 shows a flow chart of an example embodiment of a method for extracting body key points coordinates for every POI per video frame.

Referring now to FIG. 13, shown therein is a flow chart of an example embodiment of a method 1300 for extracting body key points coordinates for every POI per video frame. Method 1300 may take place after method 1200 in the application's background after the POI bounding boxes for each single video frame along with the original video frames have been determined and saved in memory.

At 1310, the device 130 takes a single video frame from the recording session. In method 1300, each single video frame from the recording session can be iterated over and processed.

At 1320, the device 130 applies human body key point extraction to a single video image. One or more persons' body key points may be detected within the video frame. This detection may be performed by a CNN, such as Posenet. The output of this extraction are coordinates of different body key points. The output may be based on all of or a subset of the key points illustrated in FIG. 11.

At 1330, the device 130 saves the body key points coordinates that were detected at 1320.

At 1340, the device 130 loads the POI bounding box coordinates. These coordinates may be the same as those from 1260 in method 1200.

At 1350, the device 130 chooses the body key point coordinates that correspond to the POI and saves them into the memory unit 148. This is done by selecting the pose object from the output saved at 1330 which has the most key points that lies inside the POI bounding box location loaded at 1340. For example, suppose there are two pose objects which correspond to two different humans standing a certain distance from one another. Then, using the information of the POI bounding box, the pose object that will be selected is the object that has more of the detected key points located within the POI bounding box compared to the detected key points of the other pose object.

At 1360, the device 130 saves into the memory unit 148 the selected pose object that is associated with each POI.

At 1370, the device 130 checks whether or not every single video frame from the recording session has been processed. If the answer is Yes (i.e., every video frame has been processed), then the method 1300 ends. If the answer is No (i.e., every video frame has not been processed), then the method 1300 returns to 1310.

Referring now to FIGS. 14 and 15, shown therein are example components that may be used in a method of POI and OOI detection. FIG. 14 shows a convolutional layer structure of an example embodiment of single shot multibox detector (SSD) 1400, while FIG. 15 shows a flow diagram of an example embodiment of a convolutional neural network (CNN) 1500 that can be used to implement single shot multibox detector 1400.

To identify the bounding box of the target person (i.e., the POI) and target objects (i.e., the OOI), the device 130 may use an open source computer vision model, the single shot multibox detector, or suitable alternatives such as, but not limited to, YOLO, Faster R-CNN, and Fast R-CNN, for example. The recognition process involves first converting each frame in the input video, that is, a two-dimensional (length, width), three-channel RGB (red, green, blue) image into a multi-dimensional tensor at act 1410. A similar conversion can be applied to each frame in the input video 1510 of the CNN 1500.

The device 130 feeds this tensor into a feedforward neural network. This feedforward neural network comprises two main parts. The first part, the base neural network 1420, performs functions to extract features from an image (e.g., the video frame 1410). This can be achieved by using an open source neural network such as VGG_16 1430 or another suitable network (e.g., Resnet 101, MobileNet, or other open source programs that try to extract features from images).

The common architecture of the CNN 1500 (or other neural networks) uses several convolutional layers 1520 and activation functions 1540, though they may not necessarily always follow the same order. One or more of the convolutional layers 1520 may perform functions to extract features from an image (e.g., the video frame 1510). In each convolutional layer, a convolutional operation is applied to the output from the previous layer (denoted by the arrow head) by using an N×N sized matrix (also commonly referred to as filters or kernels) as a filter 1530, and the resulting matrix is processed by the activation function 1540 to obtain a feature map 1550. This process may be repeated between 1520 and 1550 to generate multiple feature maps 1560. The output matrix of a given convolutional layer 1520 is used as the input matrix of the next convolutional layer and is subjected to the same convolution and activation operations with different filters.

The final output from the first stage is a 3-dimensional tensor of dimension Width*Height*Depth. The resulting width and height are the downsampled version of the original input image width and height as a result of the series of convolution operations. The depth corresponds to the total number of filters that is being used in the final output layer.

The second part of the feedforward neural network comprises the feature extraction and classification stage 1450. The network comprises additional convolutional feature layers (e.g., one or more of Conv_6 1440 to Conv_11 1460) which causes the output at each stage to decrease in size progressively. This allows for predictions of detection at multiple scales.

Each added feature layer can produce a fixed set of detection predictions 1470 using a set of convolutional filters. For a feature layer of size m*n with p channels, the basic element for predicting parameters of a potential detection 1470 is a 3*3*p small kernel that produces either a score for a category, or a shape offset relative to the default box coordinates. The variables m, n, and p may be pre-defined and be fixed values. The features here refer to features used to detect a subject or an object. The neural network SSD may been trained with a big dataset to detect different objects, such as a person, a car, a chair, a table, a bed, etc. Features here can be characteristics in the input image. The variables m and n can be determined by the convolutional operation (i.e., the filter dimension, such as 3×3 or 2×2). At a high level, features may be, for example, diagonal lines in an input image. For example, if the neural network may be called upon to classify a cross or a circle, a cross has a straight line whereas a circle does not so this straight line feature can be used by the neural network to discriminate between an object that has a cross shape versus another object that has a circular shape. The use of convolutional filters allows the neural network to determine whether these features exist in a video frame.

At each m*n location where the kernel is applied, it produces an output value. The output of the detection predictions 1470 can then be subjected to non-maximum suppression 1480.

The device 130 produces multiple feature maps at act 1560 and detects objects at act 1570. In at least one implementation, the CNN (1500) loops from act 1550 back to act 1520 at least once which allows multiple feature maps to be produced. After several steps of post processing, the final output layer of the computer vision neural network outputs a certain number of bounding boxes and the confidence score 1580 of the target objects (e.g., a person or a chair) identified in the box. The device 130 can then output the bounding box location based on the location of the target object that has the highest associated confidence score. In at least one embodiment, the device 130 only focuses on detecting two target categories, the subject who is in the physical function assessment test and the objects that the subject interacts with, such as chairs, walkers, beds, and other possible assistive tools. Alternatively, or in addition, the device 130 may focus on detecting additional target categories such as a medical professional who provides assistance to the subject during the physical function assessment.

In at least one alternative implementation of the convolutional neural network 1500, the layers from VGG_16 to Conv_11 are optional and can be replaced by multiple convolutional layers. For example, the open source CNN called YOLO, which has a different number of layers, can be used.

Referring now to FIG. 16, shown therein is a flow chart of an example embodiment of a tracking method 1600 for POI and/or OOI tracking.

At 1610, the device 130 receives a single video frame as input. This input may correspond to the single video frame obtained at 1210 from method 1200.

At 1620, the device 130 receives a bounding box location for a POI and/or OOI from a previous video frame. This bounding box input may correspond to the bounding box location determined at 1260 from method 1200.

At 1630, the device 130 receives person(s) and object(s) bounding boxes coordinates. These bounding box coordinate inputs may correspond to the coordinates determined at 1230 from method 1200.

At 1640, the device 130 uses real-time object tracking computer vision, such as Apple Vision Tracker API, to output the bounding box location of the object of interest and/or person of interest in this current video frame given its position in the last video frame. For example, the input to the vision tracking API is the current video frame from 1610, and also the known location of the POI and/or OOI in the last video frame from 1620. The output is the predicted POI and/or OOI location in the current video frame.

At 1650, the device 130 loads the predicted locations of the bounding boxes for the POI and/or OOI for the current video frame.

At 1660, the device 130 computes an Intersection over Union (IOU) between the new bounding box from 1650, and all other detected POI and/or OOI bounding boxes within the video frame from 1630. The box with the highest IOU value is selected as the POI and/or OOI bounding box for this current video frame.

In at least one implementation, the IOU value between two bounding boxes is calculated as the ratio of the area of the intersection of the two bounding boxes to the area of the union of the two bounding boxes. For example, FIG. 20 shows two bounding boxes A and B with the area of intersection colored gray. FIG. 21 shows the union of the two bounding boxes A and B with the total area colored gray. Suppose the area of intersection between the two bounding boxes is 40 units and the area of union between the two bounding boxes is 100 units. The IOU value is then 40 divided by 100, which is 0.4.

At 1670, the device 130 outputs the bounding box location for the POI and/or OOI in every video frame stored in the memory unit 148 that is to be processed for the current physical function assessment.

Referring now to FIG. 17, shown therein is a flow chart of an example embodiment of a method 1700 for extracting the 17 different key points coordinate locations, or a subset of the 17 locations shown in FIG. 11, in an image.

At 1710, the device 130 loads a single video frame.

At 1720, the device 130 may crop each input image frame from the video stream to a square dimension (e.g., 513× 513). The input video stream 1710 can be the same as the video frames obtained at 1310 from method 1300.

At 1730, the device 130 saves the cropped images to memory such as the memory unit 148.

At 1740, the device 130 performs feature extraction on the cropped images. For example, the device 130 may feed the cropped input image into an artificial neural network that is implemented in a fully convolutional fashion (e.g., a customized version of ResNet with 101 layers or MobileNet V1 with 101 layers) to produce a heatmap tensor (one channel per key point) and offset tensor (two channels per key point for the x and y direction). The choice of number of layers may depend on how much accuracy is desired, how much processing power is available, and how much time is allowed for the computations. For example, higher layers like ResNet 101 as compared to ResNet 50 can be slower but more accurate.

The output dimensions can be determined by selecting a variable value called Output Stride, and the final resolution can be calculated according to the equation resolution= ((input_image_size−1)/output_stride)+1. The output dimensions may correspond, for example, to the "Resolution" variable at acts 1750 and 1760. The Output Stride is a variable that may determine the dimensions used in acts 1750 and 1760. The values may be, for example, either 8 or 16. The higher the value, the smaller the Resolution variable is and therefore the less accurate the results but the faster the computation. For example, if the image size is 513×513 and the output stride is 16, then the resolution would be ((513− 1)/16)+1=33. For purposes of illustration only, this number is used to help describe other parts of method 1700.

At 1750, the device 130 stores the heatmap tensor, which can be a 3-Dimensional tensor of size resolution×resolution×17. The number '17' is obtained from the total number of body key points being detected. In other embodiments, a different number of key points can be used which may be more or less than 17. Each slice in the third dimension (17) corresponds to a heatmap for a specific key point. Each position in that heatmap has a confidence score which is the probability that a part of that key point exists in that specific position. This can be visualized by breaking up the original image into a 33×33 grid, where the heatmap scores for each grid square provide a classification or estimate of how likely each key point exists in each grid square.

At 1760, the device 130 stores the offset tensor, which is a 3-Dimensional tensor of size resolution×resolution×34, where '34' is the number of key points*2. For example, for an image size of 513 and an output stride of 16, the offset tensor is of size 33*33*34. The offset tensors correspond in location to the heatmap points for corresponding grid squares of act 1750, and are used to predict the exact location of the key points by traveling along the vector from the corresponding heatmap point. The vector refers to the offset tensor. The tensor contains the offset of each heatmap point. As each point in the heatmap corresponds to each point in the offset tensor at a coordinate location, by traveling along the offset tensor, the exact location of the key points in the heatmap tensor can be calculated. The first 17 slices of the offset vector contain the x offset position and the last 17 contain the y offset position.

At 1770, the device 130 processes the heatmap and offset tensors to estimate the poses from the output obtained at acts 1750 and 1760. First, a sigmoid activation is applied to the heatmap to get a new value. The position of the highest confidence value is then recorded by performing a 2-Dimensional argmax calculation on the heatmap tensor. The output is then a 17×2 tensor, with each row being the x and y index location in the heatmap associated with the highest score. This operation results in the generation of an extra 17×2 tensor that can be used to calculate the exact coordinates of the key points.

The offset vector for each key point is retrieved by getting the x and y from the offset tensor by using a value extracted from the new heatmap. This produces a tensor of size 17×2, with each row being the offset vector for the corresponding key point. To get the location of the key point in the original image, each key point's x and y positions in the heatmap (generated at act 1750) are multiplied by the output stride and then added to their corresponding offset vector, which is in the same scale as the original image. This may be done according to the equation: keypoint_positions=heatmap_positions*output_stride+offset_vectors.

Each key point confidence score is the confidence score from its respective position in the heatmap. The final pose confidence value is the average of all the confidence values from all of the key points associated with a particular pose.

At 1780, the device 130 produces a final output of body key point coordinates for a pose. The final output is retrieved from a PoseNet API consisting of a 17*2 tensor which holds the 17 different key points locations. A 17*1 array is also generated which holds the confidence scores for each key point. A floating point number can be used to store the average of all of the key points' confidence values. This can be the same as act 1320 from method 1300 (i.e., the detection of body key points 1320 for at least one person is performed using the method 1700).

Referring now to FIG. 18, shown therein is a flow chart of an example embodiment of a method 1800 for extracting feature data. Method 1800 uses the fourth computer vision technique to calculate physical assessment indicators such as, but not limited to, at least one of walking postures, gait, test time, bed lying postures, balance, and transfer assistance needed, for example, using feature data.

At 1805, the device 130 calculates key points of a target person (i.e., POI) in each video frame.

At 1810, the device 130 performs geometric operations on the key points to extract feature data including K features per video frame. The geometric operations may include calculating the angle formed by connecting certain body parts such as, but not limited to, at least two of a person's hip, knee, and ankle, for example. These calculations can be used to determine various measurement features such as, but not limited to, sit to stand transition, and number of steps, for example.

At 1815, the device 130 performs linear interpolation operations for video frames containing incomplete key points. The linear interpolation is based on the previous and subsequent feature data (i.e., from a previous and a subsequent video frame) to complement the missing feature data. Act 1815 is optional since it can be omitted if the pose estimation is sufficiently accurate, otherwise, act 1815 may be performed to improve accuracy of (i.e., to "clean up") the set of results from act 1810.

At 1820, the device 130 begins preprocessing of the feature data for prediction (e.g., by windowing). The preprocessing is used by the device 130 to analyze enough video frames in order to determine if there is a trend/pattern in the feature data. This preprocessing may be optional for some features, but it may be used for other features. For example, in order to determine the sit to stand transition time, the preprocessing may be used.

At 1825, the device 130 divides the video for the physical function assessment into a batch of m frames. Each video frame has a corresponding set of k feature data. For example, m video frames will have a corresponding total of m*k feature data. Each set of k feature data is obtained by applying a geometric calculation on the full key points from a single video frame. Hence, m video frames correspond to m groups of feature data where each group has k features.

At 1830, the device 130 feeds the m groups of feature data as input into a neural network such as a convolutional neural network (e.g., the fourth computer vision technique as shown in FIG. 19).

At 1835, the device 130 obtains the confidence scores of the posture estimate and optionally the gait estimate of a target person in each frame from the neural network (e.g., from act 1830). For example, the generated confidence scores may indicate that the possibility that a target subject (i.e., a POI) is standing in a video frame is 99% while the probability that the target subject is sitting is 0.1%.

At 1840, the device 130 slides n video frames forward (i.e., a sliding window) in the order in which the video frames are recorded. The value of n may be a predetermined proportion of m (e.g., 10% of m) or other value that may or may not change (e.g., based on desired accuracy or computational efficiency). The device 130 repeats this process to input a new set of m sets of feature data into the neural network to obtain new pose and gait classification confidence scores. This process continues until it slides to the end of the video.

At 1845, the device 130 confirms the class of each frame. This may be done, for example, by comparing the weighted average confidence scores of different classes for each video frame. For example, if there are 4 classes where the average confidence scores are class 1: 0.9, class 2: 0.05, class 3: 0.05, and class 4: 0.0, then class 1 may be selected as the output since it has the highest average confidence score.

At 1850, the device 130 confirms the posture classification for each video frame. For example, the posture class with the highest confidence score can be selected as the posture in a given video frame.

At 1855, the device 130 makes corrections to the detected posture if necessary. Act 1855 is optional since it can be omitted if the detected posture is sufficiently accurate, otherwise, act 1855 may be performed to improve accuracy of (i.e., to "clean up") the set of results from act 1850.

At 1860, the device 130 calculates the indicators related to the physical function assessment using the confirmed posture and gait.

Referring now to FIG. 19, shown therein is a flow chart of an example embodiment of a method 1900 for implementing computer vision using a convolutional neural network. As illustrated in FIG. 19, the method 1900 uses two convolutional layers, but in alternative embodiments one or more additional layers may be used.

At 1910, the device 130 calculates m features from the detected key points of a human body. These m features are used as the input data of the convolutional neural network. These calculations may be geometric calculations (e.g., as described for act 1810).

At 1920, the device 130 calculates a first set of features by using a first convolutional layer of the convolutional neural network.

At 1930, the device 130 calculates a second set of features by using a second convolutional layer of the convolutional neural network.

At 1940, the device 130 processes the features by performing maximum pooling (i.e., "maxpooling"). The maxpooling operation is an approach that can be used in computer vision based on the use of a neural network. Suppose the neural network is given a 2×2 matrix of confidence values. The neural network can perform maxpooling on the matrix by selecting the matrix element with the highest value. The neural network can use maxpooling as a way to reduce the dimensions (e.g., for optimization and memory saving). However, by performing maxpooling, the neural network can thereby select the feature from each matrix which is the "most important" (e.g., the feature that has the highest score).

At 1950, the device 130 further processes the pooled features by performing flattening. Flattening is an operation that can be used in computer vision based on the use of a neural network. For example, the neural network "prepares" the output from all the convolutional operations into a form that can be fed into a fully connected layer (i.e., that actually performs the classification). This can be done by converting a 2-dimensional matrix into a 1-dimensional array, by appending every row in the matrix to the end of the prior row from the matrix.

At 1960, the device 130 uses a fully connected layer that generates a classification result using the flattened features. For example, the fully connected layer may generate classification results such as standing, sitting, sit to stand transition, stand to sit transition, etc.

At 1970, the device 130, via the output layer, outputs the classification result.

At 1980, the device 130 saves the classification result as a posture class, which is a specific posture or gait category with the highest confidence score. Examples of different posture classes include, but are not limited to, sitting and standing, sit to stand transition, stand to sit transition, lying on bed, etc., for example.

In another aspect, in at least one embodiment described in accordance with the teachings herein, the device 130 uses internationally recognized standardized physical function assessment tests with standardized test results. Such tests include, but are not limited to, at least one of the Timed Up and Go (TUG) test, the 5 Times Sit to Stand test (STS), the Berg Balance test, the bed mobility test, the transfer between surfaces test, the walk test, the range of motion test, the gait test, the short physical performance battery protocol, the performance oriented mobility assessment, and the Mini-Balance Evaluation Systems Test (Mini-BEStest), for example. For the assessment of physical functions, the device 130 follows the evaluation criteria for these standardized physical function tests. For example, the TUG test uses the total time to complete the test as an indicator to assess physical function. If an elderly subject needs more than 12 seconds to complete the test, he or she is considered to be at risk of falling. For another example, if the STS test exceeds 10 seconds, the elderly subject is considered to have a higher risk of developing disability. For yet another example, the Berg balance test measures a variety of sitting and standing capabilities, including whether the subject needs assistance to stand from a sitting position, whether the subject can stand independently for a period of time, whether the subject needs assistance in transferring from one chair to another chair, etc. As another example, tests using gait parameters for assessment may include a 4-meter walk test with a scoring method of "gait speed of longer than 5 seconds to walk 4 meters (<0.8 m/s) suggests an increased risk of frailty and the need for further clinical review".

In another aspect, in at least one embodiment described in accordance with the teachings herein, the device 130, through posture and gait recognition, automatically identifies the start, segment, and end times of various tests, and then calculates the test segment and total completion time. For example, the automatic identification can be done by determining whether the posture class for a given video frame corresponds to the posture that occurs at the start, middle, or end of a particular test. The function assessment results are then compared with the thresholds that are predefined through standardized testing.

In another aspect, in at least one embodiment described in accordance with the teachings herein, the device 130 may be configured to calculate more indicators that cannot be measured with the naked eye in the physical function assessment tests performed manually by clinicians. These indicators include, but are not limited to, certain body angles that are made during mobility and balance tests, and certain gait parameters (steps, cadence, stride length), for example. These parameters are not yet tested in a standardized fashion for common physical function assessment, partly due to the difficulty of quantifying these indicators due to having to do this visually based on conventional methods; however, some studies have shown that these indicators are closely related to physical functions. The device 130 advantageously yields more accurate physical function assessment results, which results in a reduction in (or elimination of) inter-clinician differences, and the ability to find more nuanced indicators of physical function thereby allowing the physical function assessment testing to be performed in a more objective standardized manner.

In at least one embodiment, the device 130 is a mobile device that uses AI to extract key points of the human body using the method 1700 and then uses the key points to calculate features to evaluate the performance in physical function assessments using the method 1800.

In another aspect, in at least one embodiment described in accordance with the teachings herein, the device 130 estimates completion time of the Timed Up and Go (TUG) test using body key points extracted by the method 1700. A completion time in the TUG test is the measure of time during which the subject has stood up, walked for 3 m, and sat down again. As of the current standard practice, the calculated times are somewhat subjective as it is common for different clinicians to have different interpretations of when a subject is standing up or sitting down, which may result in variability of results across different clinicians. Advantageously, the device 130 is able to make a standardized decision of this time across all different subjects by following a robust method that determines various indicators in a common way across different subjects regardless of the user who is using the device 130. For example, the device 130 uses the output of methods 1800 and 1900 to obtain an array of length n, where n represents the total number of frames in the entire video. Each element of the array corresponds to a single image frame, and the value of each element in the array represents the current predicted pose that is either one of sitting, standing up, standing, and sitting down. The device 130 iterates over each element of the entire array and looks for a change of pose prediction between a current value and the next value in the array. The first index location (e.g., first frame) of the first change of posture from sitting to standing up is recorded. The analysis continues using subsequent images, and the second index location (e.g., second frame) of the second change of posture from standing to sitting down is recorded. Finally, the device 130 finds the frame difference (i.e., number of frames) between the first and second frames by subtracting the two values for the first and second indices and stores this variable in memory. This frame difference is then projected into differences in seconds by multiplying it with a Seconds Per Frame (SPF) variable that can be obtained by dividing the total number of frames by the total duration of the video clip. The completion time can be obtained by multiplying the frame difference by the SPF.

In another aspect, in at least one embodiment described in accordance with the teachings herein, the device 130 estimates the sit to stand transition time in a Timed Up and Go test (TUG) using body key points. This time indicator is currently not part of the standard TUG practice. It is considered a nuance indicator that the device 130 is capable of measuring and may be a useful predictor of any functional decline for the subject who is being assessed. This time is measured as the subject transitions to a standing up position from the sitting position during the start of the TUG test. The device 130 may determine this time by using the output of methods 1800 and/or 1900 to obtain an array of length n, where n represents the total number of frames in the entire video. Each element of the array corresponds to a single image frame, and the value of each element represents the current predicted pose that is either one of sitting, standing up, standing, and sitting down. The device 130 iterates over each element of the entire array and looks for a change of pose prediction between a current value and the next value in the array. The index location of the first frame where there is a change of posture from sitting to standing up is recorded. The analysis continues using subsequent images until the index location of a second frame where there is a change of posture from standing up to standing is recorded. Finally, the device 130 finds the difference between the first and second frames by subtracting the two values and stores this variable in memory. This frame difference is then projected into differences in seconds by multiplying it with a Seconds Per Frame (SPF) variable that can be obtained by dividing the total number of frames by the total duration of the video clip. The sit to stand transition time can then be obtained by multiplying the frame difference by the SPF.

In another aspect, in at least one embodiment described in accordance with the teachings herein, the device 130 estimates the stand to sit transition time in a Timed Up and Go Test (TUG) using body key points. This time indicator is currently not part of the standard TUG practice. It is considered a nuance indicator that the device 130 is capable of measuring and may be a useful predictor of any functional decline of the subject who is being assessed. This time is measured during the time period when the subject transitions to a sitting down position from the standing position towards the end of a TUG test. The device 130 may determine this time by using the output of methods 1800 and/or 1900 to obtain an array of length n, where n represents the total number of frames in the entire video. Each element of the array corresponds to a single image frame, and the value of each element represents the current predicted pose that is either one of sitting, standing up, standing, and sitting down. The device 130 iterates over each element of the entire array and looks for a change of pose prediction between a current value and the next value in the array. The index location of the first frame where there is a change of posture from standing to sitting down is recorded. The analysis continues using subsequent images until the index location of a second frame where there is a change of posture from sitting down to sitting is recorded. Finally, the device 130 finds the difference between the first and second frames by subtracting the two values and stores this variable in memory. This frame difference is then projected into differences in seconds by multiplying it with a Seconds Per Frame (SPF) variable that can be obtained by dividing the total number of frames by the total duration of the video clip. The stand to sit transition time can then be obtained by multiplying the frame difference by the SPF.

In another aspect, in at least one embodiment described in accordance with the teachings herein, the device 130 estimates the walking duration time in a Timed Up and Go Test (TUG) using body key points. This time indicator is currently not part of the standard TUG practice. It is considered a nuance indicator that the device 130 is capable of measuring and may be a useful predictor of any functional decline for the subject who is being assessed. This time is measured during which the subject is performing the three-meter walk to and from the starting position during the TUG test. The device 130 may determine this time by using the output of methods 1800 and/or 1900 to obtain an array of length n, where n represents the total number of frames in the entire video. Each element of the array corresponds to a single image frame, and the value of each element represents the current predicted pose that is either one of sitting, standing up, standing, and sitting down. The device 130 iterates over each element of the entire array and looks for a change of pose prediction between a current value and the next value. The index location of the first frame where there is a change of posture from standing up to standing is recorded. The analysis continues using subsequent images until the index location of a second frame where there is a change of posture from standing to sitting down is recorded. Finally, the device 130 finds the difference between the first and second frames by subtracting the two values and stores this variable in memory. This frame difference is then projected into differences in seconds by multiplying it with a Seconds Per Frame (SPF) variable that can be obtained by dividing the total number of frames by the total duration of the video clip. The walking duration time can then be obtained by multiplying the frame difference by the SPF.

In another aspect, in at least one embodiment described in accordance with the teachings herein, the device 130 evaluates/measures transfer (e.g., to and from bed, chair, wheelchair, standing position) difficulty using body key points that may be extracted using method 1700. Transfer is defined as how a person moves between surfaces such as to and from: a bed, a chair, a wheelchair, and a standing position. Transfer is evaluated at different difficulty levels for the subject, including when the subject is independent, when the subject is being supervised, when the subject is provided with limited assistance, when the subject is provided with extensive assistance, when there is total dependence by the subject, and when subject activity does not occur during the entire seven-day period. The device 130 may use the methodology shown in FIGS. 14 and 15 to detect one or multiple POIs and OOIs (bed, chair, wheelchair) and the method 1800 to detect different body postures (e.g., seated, standing position). The device 130 is capable of detecting which surface a person is on (e.g., lying in bed, sitting on a bed, sitting on a chair) by using a technique such as Intersection over Union (IOU), for example. The IOU is computed between the bounding box of a POI and all bounding boxes of the OOIs. The bounding box of an OOI that produced the biggest IOU value with the bounding box of the POI is chosen as where the POI is staying. The device 130 keeps track of the change of location of POI and calculates the time used to transfer from location A to B. To detect supervision, the device 130 is able to detect two POIs (e.g., one staff and one elderly) and their body proximity and postures, which indicates supervision in transfer is required. In addition, the device 130 detects the use of a walker or a chair next to the bed as an assistance for transfer by identifying a walker or a chair as an OOI and its proximity to the POI.

In another aspect, in at least one embodiment described in accordance with the teachings herein, the device 130 evaluates/measures a subject's standing balance in a balance test using body key points which may be extracted using method 1700. The device 130 uses coordinates of body key points (e.g., trunk, legs, ankles) and limb angles calculated from the key points to measure the one or more indicators of balance. The device 130 may compare the coordinates of both ankles to decide if both feet are together or if one foot is in front of the other. The device 130 may use the variability of changes in the x and y coordinates of the key points on the subject's trunk in a series of video frames to indicate body sway in order to evaluate imbalance and rebalance. The device 130 may use the methodology shown in FIGS. 14 and 15 to detect one or multiple POIs and OOIs, and use key points detected by method 1700 to determine a POI using any other person or OOI (e.g., walker, chair) as a support during the balance test to indicate imbalance. One test may be to stand with feet together, side-by-side, for 10 seconds. Another test may be to stand with one foot half-way in front of the other foot for 10 seconds. The scoring may be based on whether the feet move out of position before 10 seconds have elapsed. The scoring may also be based on whether physical support from others or an assistive device is detected during the physical assessment (e.g., if there is more than one person in the camera view using object detection). It should be noted that another period of time other than seconds may be used.

In another aspect, in at least one embodiment described in accordance with the teachings herein, the device 130 estimates stride length of a subject in a Timed Up and Go Test (TUG) using body key points. This length is measured during which the subject is performing the three-meter walk to and from the starting position during the TUG test. The distance between left and right feet is calculated using coordinates of ankle key points detected by method 1700 and/or 1800. The distance is normalized based on the height of the body calculated by the distance between key points on head and ankle.

In another aspect, in at least one embodiment described in accordance with the teachings herein, the device 130 estimates completion time of a 5 times Sit to Stand test using body key points. A completion time in the Sit to Stand test is the time it takes the subject to complete the motions of moving from a sitting position to a standing position 5 times and then finally sitting on a chair. The device 130 is able to make a standardized decision of this time across all different subjects. The device 130 may use the output of methods 1800 and/or 1900 to obtain an array of length n, where n represents the total number of frames in the entire video. Each element of the array corresponds to a single image frame, and the value of each element represents the current predicted pose that is either one of sitting, standing up, and standing. The device 130 iterates over each element of the entire array and looks for a change of pose prediction between a current value and the next value in the array. The index location of the frame where there is a first change of posture from sitting to standing up is recorded. The analysis continues using subsequent images until the index location of a second frame where there is a change of posture from standing up to standing is recorded. Finally, the device 130 finds the difference between first and second frame by subtracting the two values and stores this variable in memory. This frame difference is then projected into differences in seconds by multiplying it with a Seconds Per Frame (SPF) variable that can be obtained by dividing the total number of frames by the total duration of the video clip. The completion time can be obtained by multiplying the frame difference by the SPF.

In another aspect, in at least one embodiment described in accordance with the teachings herein, the device 130 estimates walk normality in a walk test using body key points. The device 130 uses coordinates of body key points (e.g., trunk, legs, ankles) and limb angles calculated from the key points to measure the one or more indicators. One measure of walk normality may involve the device 130 comparing the coordinates of both feet to decide if the feet move in similar ways. Alternatively, or in addition thereto, another measure of walk normality may involve the device 130 using the variability in the x and y coordinates of the key points on the trunk to indicate body sway in order to evaluate walking postures. The variability may be obtained by calculating the variance and/or standard deviation in x and y coordinates in a specified number of consecutive video frames. If the variance and/or standard deviation is higher than a pre-defined threshold, a body sway is determined.

In another aspect, in at least one embodiment described in accordance with the teachings herein, the device 130 is configured to perform at least one range of motion test using body key points for certain body parts. Range of motion is the extent of movement of a joint. It is measured by the angle of two body parts that connect to the same joint in a 2-dimensional surface. For example, the shoulder abduction range of motion is measured by calculating the angle between the vertical middle line of the body trunk and a raised arm to the side of the body. The device 130 uses key points on two body parts (e.g., trunk and arm) to calculate the angle. The angle calculation may be done in three steps. First, the device 130 uses the x and y coordinates of key points on the two body parts to form two imaginary lines, where each imaginary line represents one body part in the same 2-dimensional coordinate system. Second, the device 130 calculates the slopes of the two lines in the same 2-dimensional coordinate system. Third, the device 130 calculates the angle between the two lines using the slope values. The output of the range of motion test may include, for example, the angle in degrees (or radians), a score based on the angle (e.g., for a comparison to an angle determined from a normative range of motion for a normal population (e.g., by age, sex, activity level, etc.) of people having normal range of motion and the patient/subject belongs to this population), or a comparison of the angle to a previously measured angle (e.g., from a previous range of motion test). In performing the range of motion test, at least one processor of the device 130 may employ one or more of the methods described herein.

In another aspect, in at least one embodiment described in accordance with the teachings herein, the device 130 is configured to perform a gait test. In performing the gait test, at least one processor of the device 130 may employ one or more of the methods described herein. For example, the gait test may involve determining gait parameters (e.g., number of steps, cadence, stride length, arm swing) based on the movements of the subject, and performing assessment analytics based on at least one of determined gait parameters. In performing the gait test, the device 130 may determine a gait estimate and/or gait classification confidence score as described herein.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. An AI-based method for performing at least one of Person of Interest (POI) and Object of Interest (OOI) tracking, wherein the method is performed by at least one processor and the method comprises:
    receiving a video frame;
    receiving a bounding box location for a bounding box associated with a target object in the video frame, the target object being one of a POI and an OOI;
    receiving bounding box coordinates associated with the bounding box location;
    outputting the bounding box location on a display in real time;
    determining a predicted location of the target object;
    computing intersection over union (IOU) values between the bounding box location and other bounding box locations within the video frame;
    selecting the bounding box location having a highest IOU value; and
outputting the selected bounding box location in the video frame on the display.

2. The method of claim 1, wherein the method comprises:
    converting the video frame into a tensor with multiple dimensions;
    feeding the tensor into a feedforward neural network;
    extracting features from the video frame based on outputs from the feedforward neural network;
    generating a feature map by applying a convolutional neural network to the extracted features;
    determining the target objects with associated confidence scores from the feature map; and
    outputting the bounding box location based on a location of the target object having a highest associated confidence score.

3. The method of claim 2, wherein the method comprises applying the convolutional neural network by performing convolutional and activation operations wherein for a given layer of the convolutional neural network a given convolutional operation is applied to an output of a previous layer in the convolutional neural network to generate a matrix and the matrix is processed using a given activation operation to generate the feature map.

4. The method of claim 3, wherein the method comprises applying different filters for the activation operations that are performed at different layers of the convolutional neural network.

5. The method of claim 1 for performing feature extraction and posture recognition of a Person of Interest (POI), wherein the method further comprises:
    calculating key points of the POI in a series of video frames;
    performing geometric operations on the calculated key points to extract feature data;
    performing linear interpolation operations on the extracted feature data to determine missing feature data;
    dividing the video frames into a batch of m video frames, where m refers to a number of video frames in the batch, that correspond to m groups of feature data;
    feeding the m groups of feature data into an artificial neural network;
    obtaining confidence scores of posture and optionally gait for the POI in the m video frames based on the output of the artificial neural network;
    determining a weighted average of confidence scores for each of the video frames; and
    confirming a posture classification and optionally a gait classification for each of the video frames by comparing the weighted average of confidence scores for each of the video frames.

6. The method of claim 5, wherein the method further comprises calculating indicators related to a physical function performed by the POI using the confirmed posture classification and the optional gait classification.

7. The method of claim 5, wherein the method further comprises:
    calculating the m groups of feature data based on key points of the POI;
    calculating a first set of features by using a first convolutional layer of a convolutional neural network;
    calculating a second set of features by using a second convolutional layer in the convolutional neural network;
    processing the first set of features and the second set of features by applying at least one of maximum pooling and flattening;
    generating a fully connected layer for performing classification using the first set of features and the second set of features;
    determining potential classification results using the fully connected layer, where a potential classification result includes a posture class having a confidence score; and
    outputting a classification result as the posture class having a highest confidence score.

8. The method of claim 1 for extracting body key points for calculating physical function features for the POI, the POI being contained within the video frame, wherein the method further comprises:
    cropping the video frame to generate a cropped image;
    feeding the cropped image into an artificial neural network to produce a heatmap tensor and an offset tensor;
    determining output dimensions based at least in part on a size of the cropped image;

processing the heatmap tensor and the offset tensor based at least in part on the output dimensions to estimate poses of the POI and generate respective confidence values; and producing a final output of body key point coordinates based on the estimated poses and the respective confidence values.

9. The method of claim 8, wherein the cropped image has square dimensions.

10. The method of claim 8, wherein the method determines the estimated poses by performing feature extraction and posture recognition of the POI.

11. The method of claim 1, wherein the method is applied to physical function assessment in at least one of sport injury rehabilitation, child development rehabilitation, elderly physical function tests, limb-related exercise performance, weight training, or yoga exercise.

12. The method of claim 11, wherein the physical function assessment comprises at least one of a timed up and go test, a sit to stand test, a balance test, a bed mobility test, a transfer between surfaces test, a walk test, a range of motion test, or a gait test.

13. A method of generating physical function assessment recordings and assessment performance analytics for a subject, wherein the method is performed by at least one processor and the method comprises:
obtaining a series of video frames including the subject;
detecting the subject as a Person of Interest (POI) and detecting an Object of Interest (OOI) in one of the video frames;
tracking movement of the POI and the location of the OOI in subsequent video frames;
detecting at least one of postures and posture transitions of the POI based on the tracking;
calculating test completion time for the POI based on the tracking and a type of physical function being performed by the POI in the video frames;
calculating at least one physical function indicator from the tracking; and
generating function analytics based at least in part on the test completion time and the at least one physical function indicator.

14. The method of claim 13, wherein the method further comprises measuring gait parameters of the POI based on the tracking.

15. The method of claim 13, wherein the tracking of the POI and/or OOI comprises:
receiving a bounding box location for a bounding box associated with a target object in the one of the video frames, the target object being one of the POI or the OOI;
receiving bounding box coordinates associated with the bounding box location;
determining a predicted location of the target object;
computing intersection over union (IOU) values between the bounding box location and other bounding box locations within the one of the video frames;
selecting the bounding box location having a highest IOU value; and
outputting the selected bounding box location as representing the movement or location of the target object.

16. The method of claim 13, wherein the detecting of the POI and/or the OOI comprises:
converting the one of the video frames into a tensor with multiple dimensions, the tensor being associated with a target object in the one of the video frames, the target object being one of the POI or the OOI;

feeding the tensor into a feedforward neural network;
extracting features from the one of the video frames based on outputs from the feedforward neural network;
generating a feature map by applying a convolutional neural network to the extracted features;
determining the target object with associated confidence scores from the feature map; and
outputting the bounding box location based on a location of the target object having a highest associated confidence score.

17. The method of claim 13, wherein the detecting of postures and/or posture transitions of the POI comprises:
calculating key points of the POI in the series of video frames;
performing geometric operations on the calculated key points to extract feature data;
performing linear interpolation operations on the extracted feature data to determine missing feature data;
dividing the video frames into a batch of m video frames, where m refers to a number of video frames in the batch, that correspond to m groups of feature data;
feeding the m groups of feature data into an artificial neural network;
obtaining confidence scores of posture and optionally gait for the POI in the m video frames based on the output of the artificial neural network;
determining a weighted average of confidence scores for each of the video frames; and
confirming a posture classification and optionally a gait classification for each of the video frames by comparing the weighted average of confidence scores for each of the video frames.

18. The method of claim 13, wherein the calculating of at least one physical function indicator comprises:
cropping the one of the video frames to generate a cropped image;
feeding the cropped image into an artificial neural network to produce a heatmap tensor and an offset tensor;
determining output dimensions based at least in part on a size of the cropped image;
processing the heatmap tensor and the offset tensor based at least in part on the output dimensions to estimate poses of the POI and generate respective confidence values; and
producing a final output of body key point coordinates based on the estimated poses and the respective confidence values.

19. The method of claim 13, wherein the method is applied to physical function assessment in at least one of sport injury rehabilitation, child development rehabilitation, elderly physical function tests, limb-related exercise performance, weight training, and yoga exercise.

20. The method of claim 19, wherein the physical function assessment comprises at least one of a timed up and go test, a sit to stand test, a balance test, a bed mobility test, a transfer between surfaces test, a walk test, a range of motion test, or a gait test.

21. A device for performing an AI-based physical assessment, wherein the device comprises:
a data store having stored thereon computer-executable instructions; and
at least one processor that is operatively coupled to the data store and, when executing the computer-executable instructions, is configured to perform:

an AI-based method for performing at least one of Person of Interest (POI) and Object of Interest (OOI) tracking that comprises:
receiving a video frame;
receiving a bounding box location for a bounding box associated with a target object in the video frame, the target object being one of the POI and the OOI;
receiving bounding box coordinates associated with the bounding box location;
outputting the bounding box location on a display in real time;
determining a predicted location of the target object;
computing intersection over union (IOU) values between the bounding box location and other bounding box locations within the video frame;
selecting the bounding box location having a highest IOU value; and
outputting the selected bounding box location in the video frame on the display;
an AI-based method for performing feature extraction and posture recognition of the POI;
an AI-based method for extracting body key points for calculating physical function features for the POI; and
a method of generating physical function assessment recordings and assessment performance analytics for a subject.

22. The device of claim 21, wherein to perform the AI-based method for performing feature extraction and posture recognition of the POI, the at least one processor is configured to:
calculate key points of the POI in a series of video frames;
perform geometric operations on the calculated key points to extract feature data;
perform linear interpolation operations on the extracted feature data to determine missing feature data;
divide the video frames into a batch of m video frames, where m refers to a number of video frames in the batch, that correspond to m groups of feature data;
feed the m groups of feature data into an artificial neural network;
obtain confidence scores of posture and optionally gait for the POI in the m video frames based on the output of the artificial neural network;
determine a weighted average of confidence scores for each of the video frames; and
confirm a posture classification and optionally a gait classification for each of the video frames by comparing the weighted average of confidence scores for each of the video frames.

23. The device of claim 21, wherein to perform the AI-based method for extracting body key points for calculating physical function features for the POI, the at least one processor is configured to:
receive a video frame containing the POI;
crop the video frame to generate a cropped image;
feed the cropped image into an artificial neural network to produce a heatmap tensor and an offset tensor;
determine output dimensions based at least in part on a size of the cropped image;
process the heatmap tensor and the offset tensor based at least in part on the output dimensions to estimate poses of the POI and generate respective confidence values; and
produce a final output of body key point coordinates based on the estimated poses and the respective confidence values.

24. The device of claim 21, wherein to perform the method of generating physical function assessment recordings and assessment performance analytics for a subject, the at least one processor is configured to:
obtain a series of video frames including the subject;
detect the subject as the POI and detecting the OOI in one of the video frames;
track movement of the POI and the location of the OOI in subsequent video frames;
detect at least one of postures and posture transitions of the POI based on the tracking;
calculate test completion time for the POI based on the tracking and a type of physical function being performed by the POI in the video frames;
calculate at least one physical function indicator from the tracking; and
generate function analytics based at least in part on the test completion time and the at least one physical function indicator.

* * * * *